(12) United States Patent
Taninaka et al.

(10) Patent No.: US 11,086,435 B2
(45) Date of Patent: Aug. 10, 2021

(54) DRIVE CONTROL DEVICE, ELECTRONIC DEVICE, AND DRIVE CONTROL METHOD

(71) Applicant: FUJITSU LIMITED, Kawasaki (JP)

(72) Inventors: Kiyoshi Taninaka, Ebina (JP); Akinori Miyamoto, Sagamihara (JP); Sachihiro Youoku, Kawasaki (JP); Yuichi Kamata, Isehara (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/727,697

(22) Filed: Dec. 26, 2019

(65) Prior Publication Data

US 2020/0133425 A1 Apr. 30, 2020

Related U.S. Application Data

(63) Continuation of application No. PCT/JP2017/025295, filed on Jul. 11, 2017.

(51) Int. Cl.
*G06F 3/041* (2006.01)
*G06F 3/01* (2006.01)
*G06F 3/044* (2006.01)
*G06F 3/0488* (2013.01)

(52) U.S. Cl.
CPC ............ *G06F 3/0414* (2013.01); *G06F 3/016* (2013.01); *G06F 3/044* (2013.01); *G06F 3/0488* (2013.01); *G06F 2203/014* (2013.01); *G06F 2203/04101* (2013.01)

(58) Field of Classification Search
CPC combination set(s) only.
See application file for complete search history.

(56) References Cited

U.S. PATENT DOCUMENTS

| 9,678,592 | B2 | 6/2017 | Takeuchi |
| 10,088,905 | B2 | 10/2018 | Haga et al. |
| 2013/0321321 | A1* | 12/2013 | Hiraoka ............... G06F 1/1626 345/173 |
| 2014/0125468 | A1* | 5/2014 | Makinen ............. G09B 21/003 340/407.1 |
| 2016/0342215 | A1 | 11/2016 | Endo et al. |

FOREIGN PATENT DOCUMENTS

| JP | 2010/231609 A | 10/2010 |
| JP | 2015-097076 A | 5/2015 |
| JP | 2015-114816 A | 6/2015 |
| WO | 2015121964 A1 | 8/2015 |

* cited by examiner

*Primary Examiner* — Deeprose Subedi
(74) *Attorney, Agent, or Firm* — Maschoff Brennan

(57) ABSTRACT

A drive control device being configured to provide a signal to an electronic device, the electronic device including a top panel having an operation surface, and a position detection circuit configured to detect a position of an operational input performed on the operation surface, and a vibrating element configured to generate vibration in the operation surface, the drive control device comprising: processor circuitry configured to execute a drive control processing that includes driving the vibrating element of the electronic device with a drive signal, the drive signal being configured to cause the vibrating element to generate natural vibration in the operation surface and being obtained by modulating a waveform signal of a first frequency in an ultrasonic band with a modulation signal of a second frequency having a difference from the first frequency, the difference being able to be sensed by a tactile receptor of a human.

7 Claims, 22 Drawing Sheets

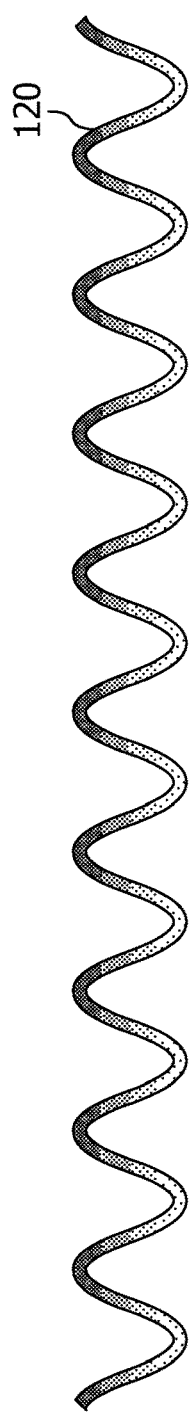
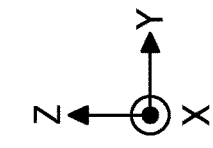
FIG. 4A
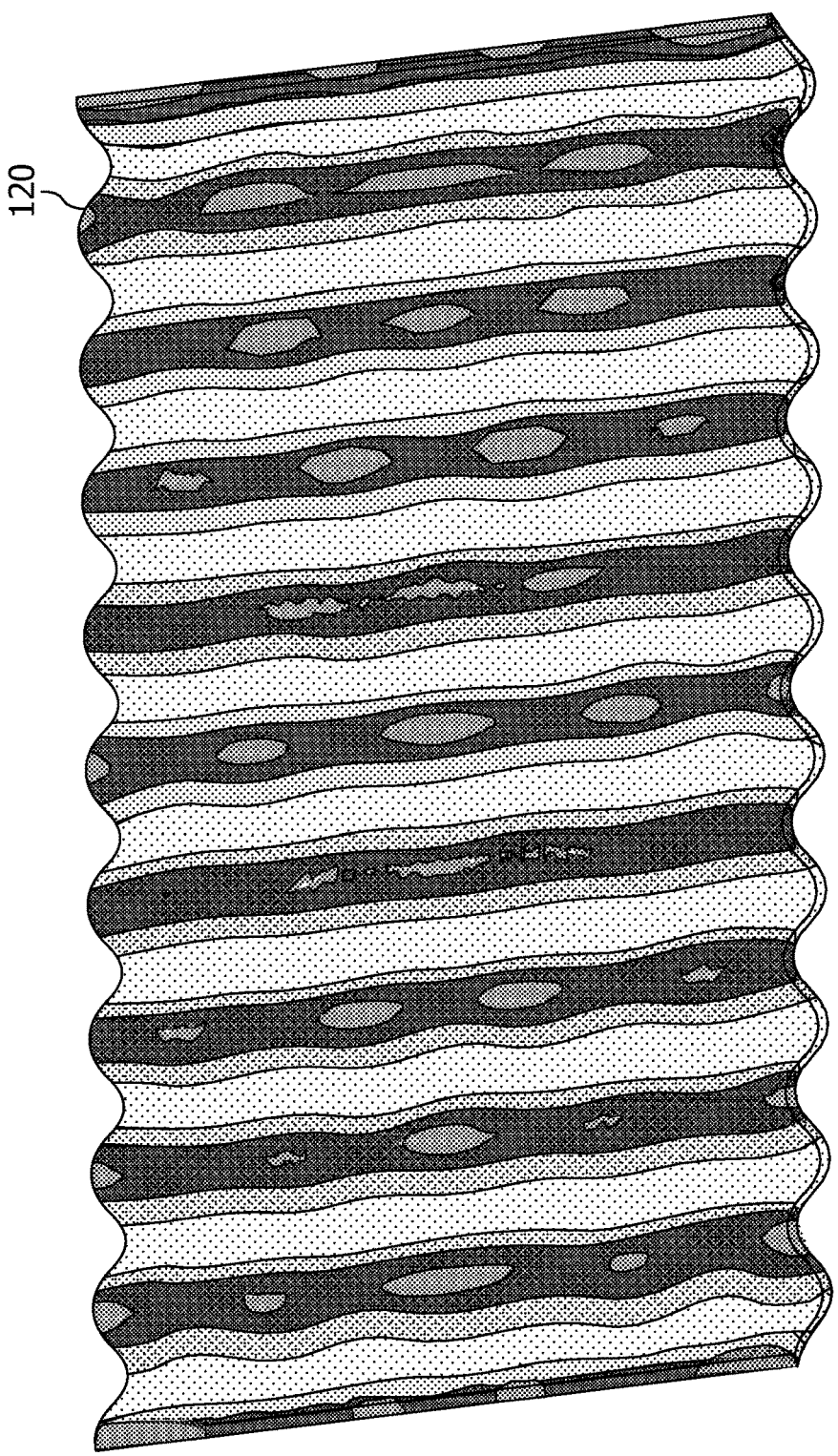
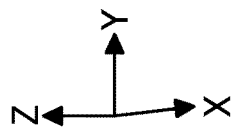
FIG. 4B

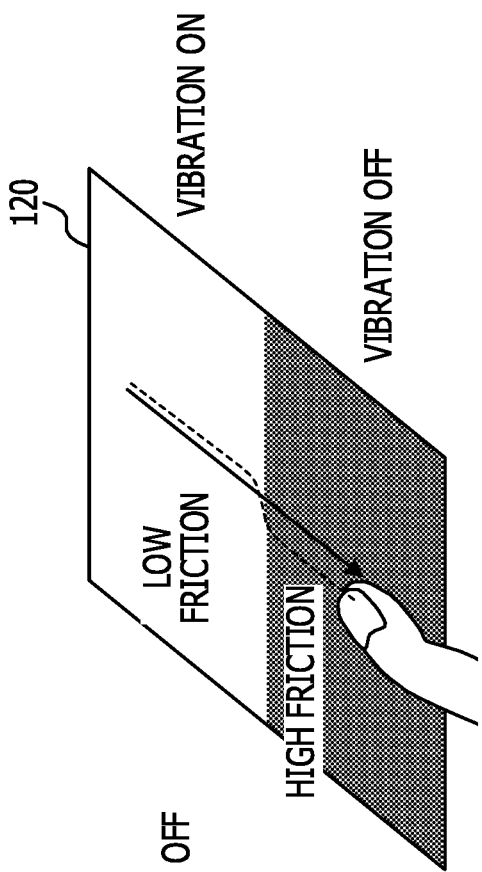
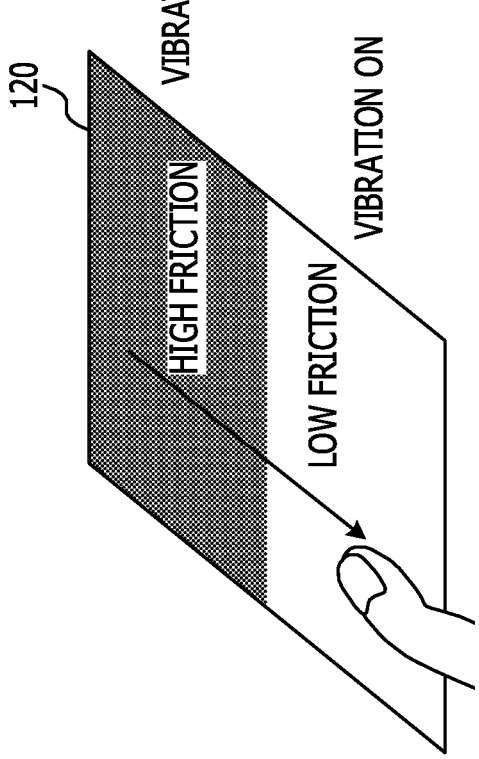

FIG. 7

| APPLICATION ID | AREA DATA | FIRST VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
|  |  |  |

FIG. 8

| APPLICATION ID | AREA DATA | SECOND VIBRATION PATTERN |
|---|---|---|
| 1 | f11=(X,Y) | P11 |
| 1 | f12=(X,Y) | P12 |
| 1 | f13=(X,Y) | P13 |
| 1 | f14=(X,Y) | P14 |
| | | |

FIG. 9
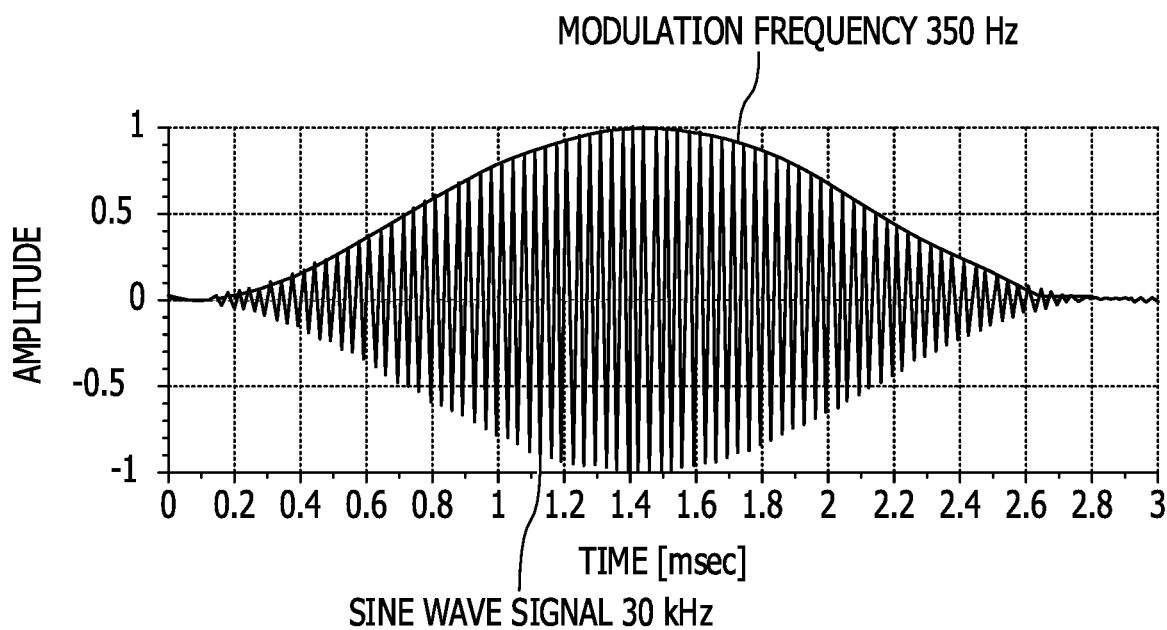
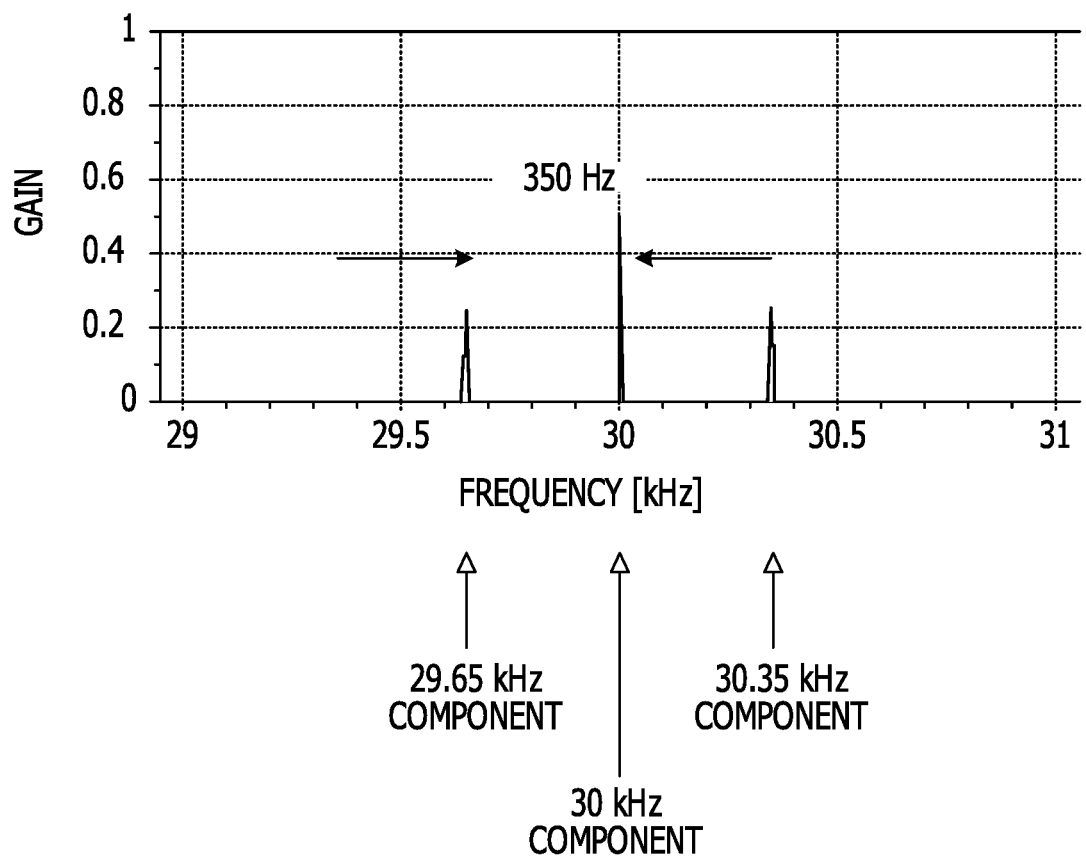

FIG. 10
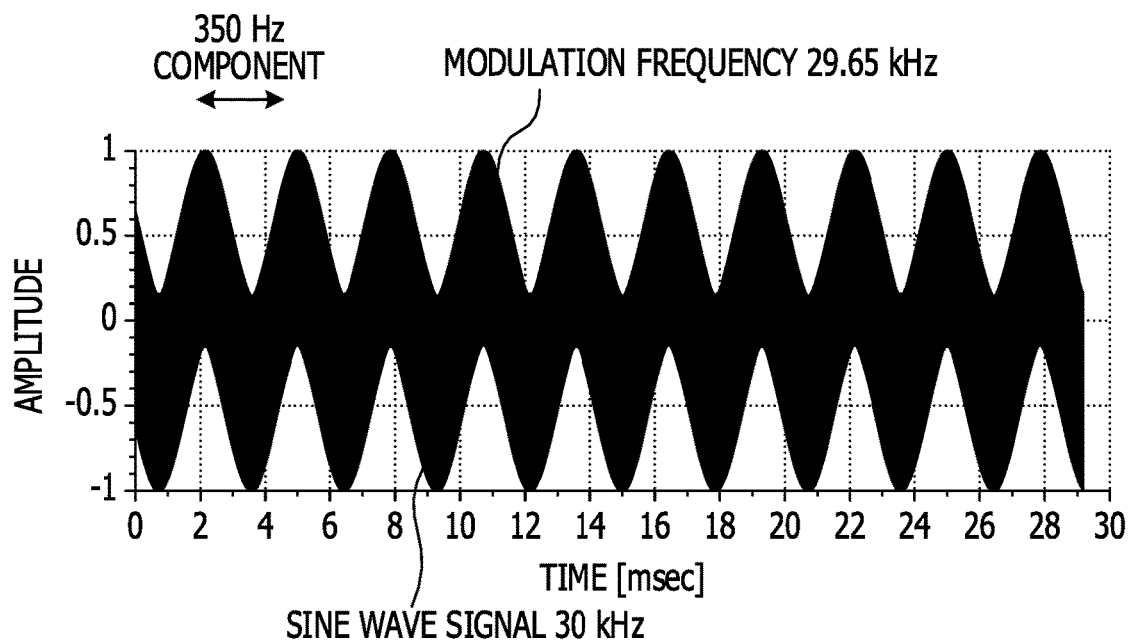
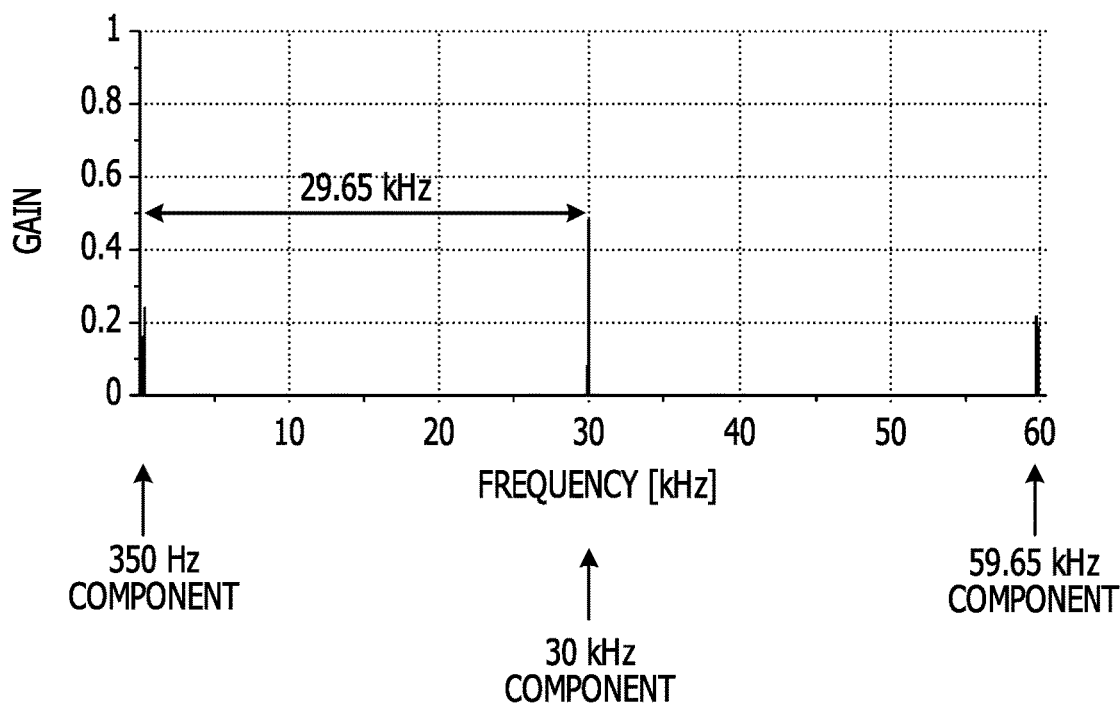

FIG. 13
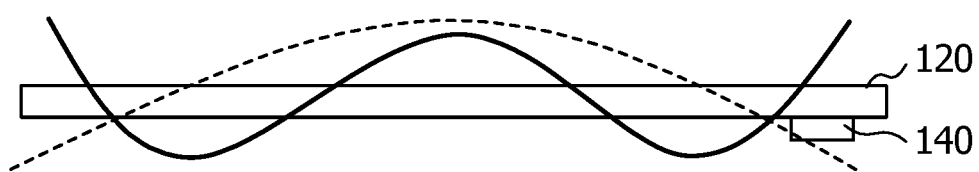
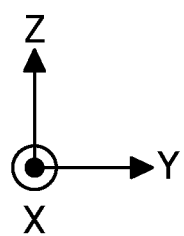

DRIVE CONTROL DEVICE, ELECTRONIC DEVICE, AND DRIVE CONTROL METHOD

CROSS-REFERENCE TO RELATED APPLICATION

This application is a continuation application of International Application PCT/JP2017/025295 filed on Jul. 11, 2017 and designated the U.S., the entire contents of which are incorporated herein by reference.

FIELD

The present invention relates to a drive control device, an electronic device, and a drive control method.

BACKGROUND

Conventionally, there have been tactile presentation devices each including a support substrate, a plurality of X electrodes parallel to one another and extending in a first direction on the support substrate, and a plurality of Y electrodes parallel to one another, extending in a second direction on the support substrate and insulated from the X electrodes each other.

A tactile presentation device includes a drive circuit that applies a voltage signal of a first frequency to an X electrode corresponding to a target area input from an outside, of the X electrodes, applies a voltage signal of a second frequency to a Y electrode corresponding to the target area, of the Y electrodes, and generates electric beat vibration in the target area according to an absolute value of a difference between the first frequency and the second frequency.

An example of the related art includes Japanese Laid-open Patent Publication No. 2015-097076.

SUMMARY

According to an aspect of the embodiments, provided is a drive control device being configured to provide a signal to an electronic device, wherein the electronic device includes a top panel having an operation surface, and a position detection circuit configured to detect a position of an operational input performed on the operation surface, and a vibrating element configured to generate vibration in the operation surface. The drive control device includes: a memory; and processor circuitry coupled to the memory, the processor circuitry being configured to execute a drive control processing that includes driving the vibrating element of the electronic device with a drive signal, the drive signal being configured to cause the vibrating element to generate natural vibration in the operation surface and being obtained by modulating a waveform signal of a first frequency in an ultrasonic band with a modulation signal of a second frequency that is a frequency having a difference from the first frequency, the difference being able to be sensed by a tactile receptor of a human.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B depict views illustrating a wave head formed in parallel to a short side of a top panel among standing waves generated in the top panel by natural vibration in an ultrasonic band.

FIGS. 5A and 5B depict diagrams for describing a state in which a dynamic friction force applied to a fingertip performing an operational input changes due to the natural vibration in the ultrasonic band generated in the top panel of the electronic device.

FIG. 7 is a table illustrating data to be stored in a memory.

FIG. 8 is a table illustrating data to be stored in a memory.

FIG. 9 is a graph illustrating frequency characteristics of an amplitude and a gain of a first drive signal.

FIG. 10 is a graph illustrating frequency characteristics of an amplitude and a gain of a second drive signal.

FIG. 13 is a graph illustrating vibration generated in the top panel.

DESCRIPTION OF EMBODIMENT(S)

By the way, the conventional tactile presentation device gives vibration to a finger of a user, using an electrostatic force acting between the X electrode or Y electrode and the finger as an attractive force. Since generation of a sufficiently strong vibration is not easy by the electrostatic force, a favorable tactile sensation may not be able to be provided.

In view of the foregoing, an object is to provide a drive control device, an electronic device, and a drive control method capable of providing a favorable tactile sensation.

A drive control device, an electronic device, and a drive control method capable of providing a favorable tactile sensation can be provided.

Hereinafter, an embodiment to which a drive control device, an electronic device, and a drive control method according to the present invention are applied will be described.

Embodiment

Figure 1:
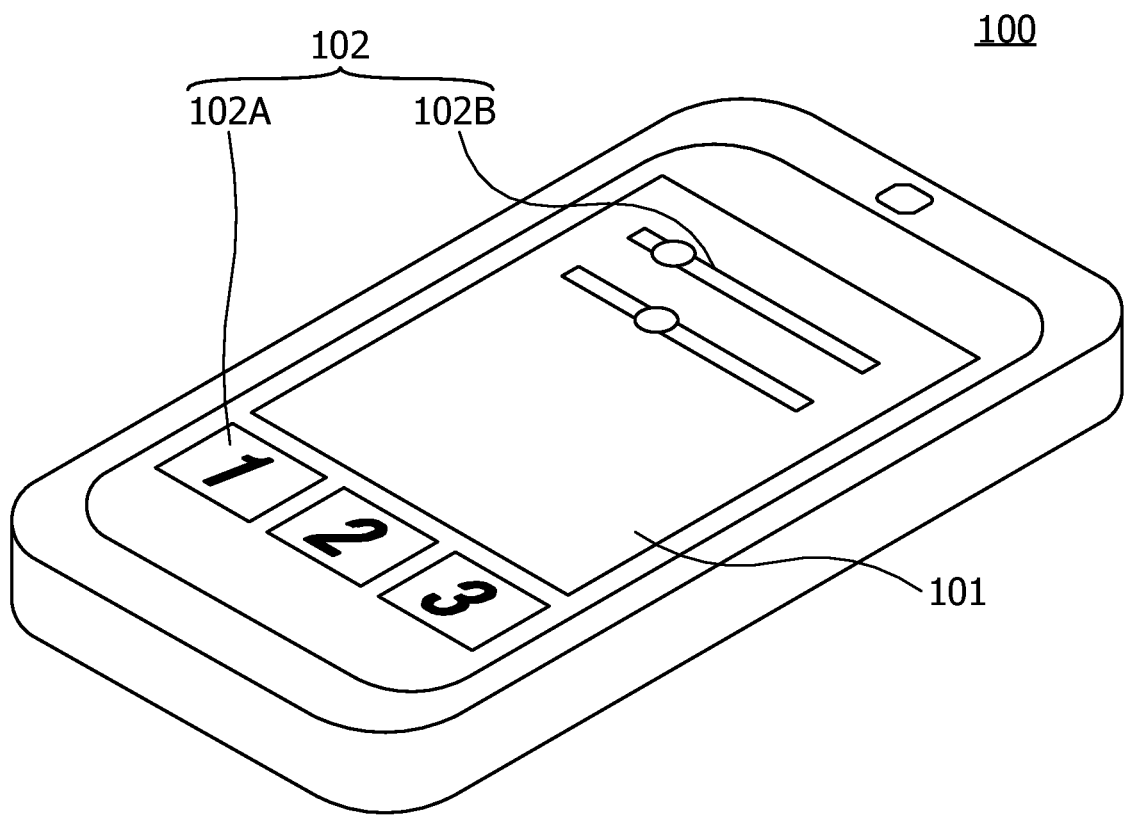
FIG. 1 is a perspective view illustrating an electronic device according to an embodiment.

FIG. 1 is a perspective view illustrating an electronic device 100 according to an embodiment.

Examples of the electronic device 100 include a smartphone terminal or a tablet computer using a touch panel as an input operation unit. Since the electronic device 100 is only required to be a device using a touch panel as an input operation unit, the electronic device 100 may be, for example, a mobile information terminal or a device installed and used at a specific place, such as an automatic teller machine (ATM).

The electronic device 100 includes an input operation unit 101 in which a display panel is disposed below the touch panel, and various buttons 102A, sliders 102B, or the like using a graphic user interface (GUI) (hereinafter referred to as GUI operation portion 102) are displayed on the display panel.

A user of the electronic device 100 normally touches the input operation unit 101 with his/her fingertip to operate the GUI operation portion 102.

Next, a specific configuration of the electronic device 100 will be described with reference to FIG. 2.

Figure 2:
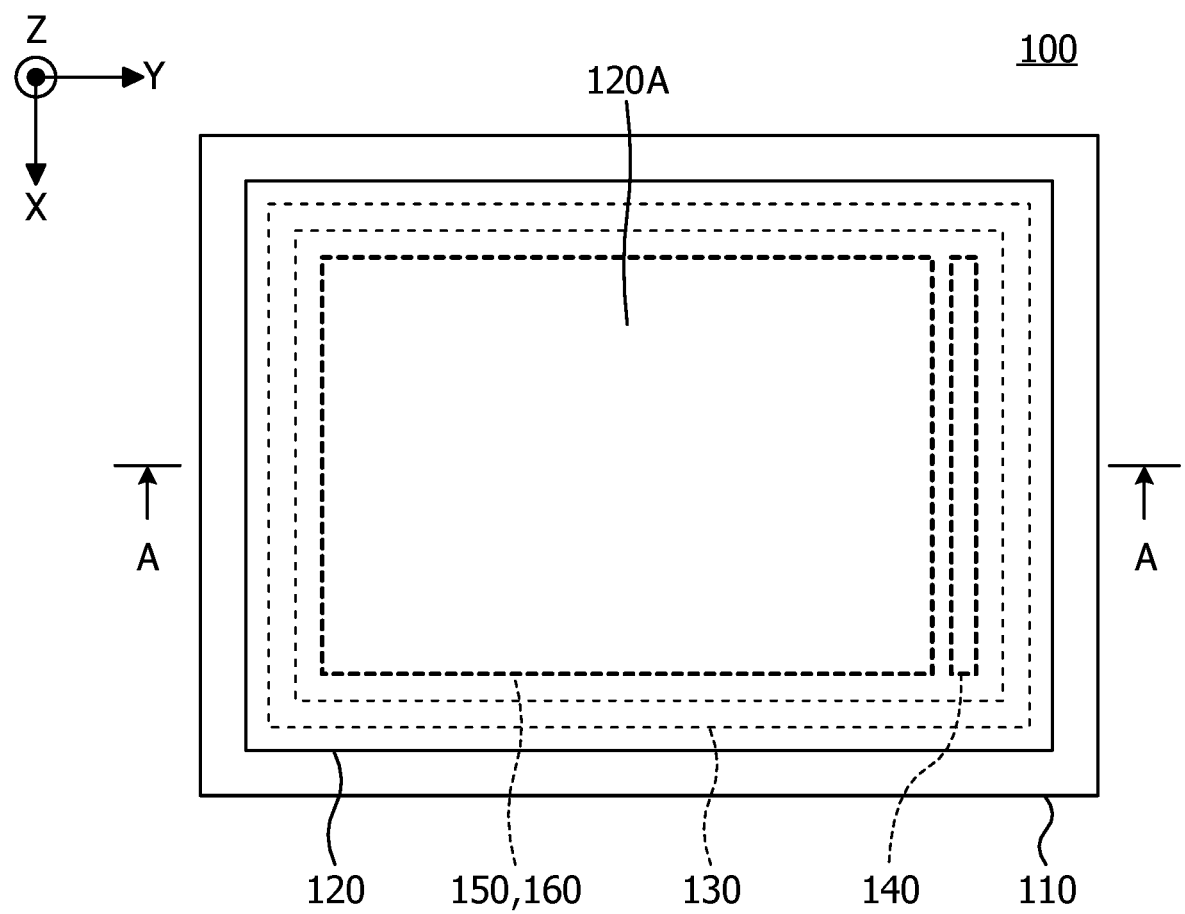
FIG. 2 is a plan view illustrating the electronic device according to the embodiment.
Figure 3:
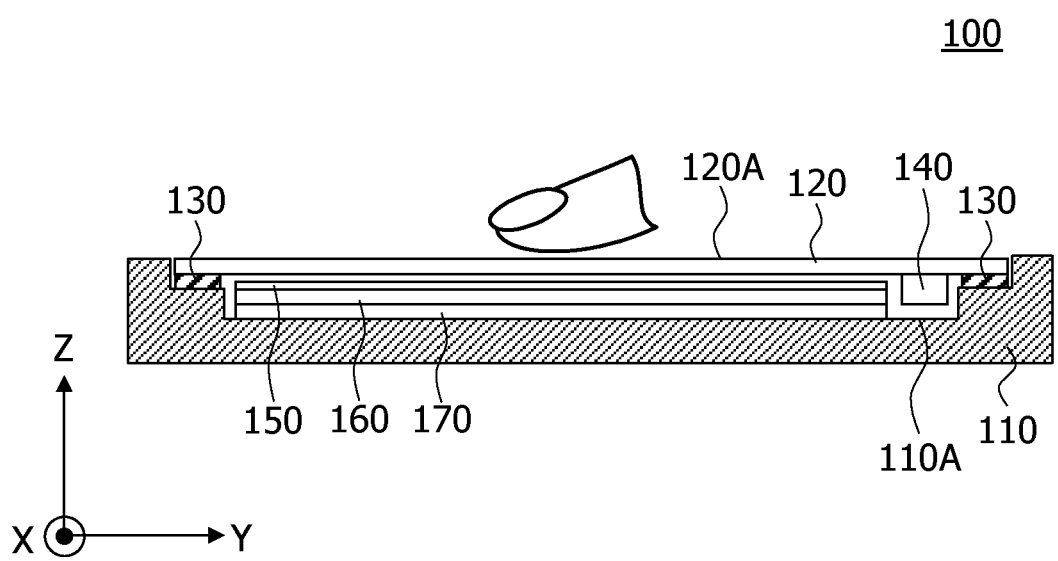
FIG. 3 is a view illustrating a cross section with arrows taken along line A-A of the electronic device illustrated in FIG. 2.

FIG. 2 is a plan view illustrating the electronic device 100 according to the embodiment, and FIG. 3 is a view illustrating a cross section with arrows taken along line A-A of the electronic device 100 illustrated in FIG. 2. Note that an XYZ coordinate system, which is an orthogonal coordinate system, is defined as illustrated in FIGS. 2 and 3.

The electronic device 100 includes a housing 110, a top panel 120, a double-sided tape 130, a vibrating element 140, a touch panel 150, a display panel 160, and a substrate 170.

The housing 110 is made of, for example, resin, and as illustrated in FIG. 3, the substrate 170, the display panel 160, and the touch panel 150 are disposed in a recess 110A, and the top panel 120 is bonded by the double-sided tape 130.

The top panel 120 is a thin tabular member that is rectangular in a plan view, and is made of transparent glass or reinforced plastic such as polycarbonate. A surface 120A (surface on a Z-axis positive direction side) of the top panel 120 is an example of an operation surface on which the user of the electronic device 100 performs an operational input.

On the top panel 120, the vibrating element 140 is bonded to the surface on a Z-axis negative direction side, and four sides in a plan view are bonded to the housing 110 by the double-sided tape 130. Note that the double-sided tape 130 only needs to be capable of bonding the four sides of the top panel 120 to the housing 110, and does not need to be a rectangular ring as illustrated in FIG. 3.

The touch panel 150 is disposed on the Z-axis negative direction side of the top panel 120. The top panel 120 is provided to protect the surface of the touch panel 150. Note that another panel, a protective film, or the like may be further provided on the surface 120A of the top panel 120.

The top panel 120 vibrates when the vibrating element 140 is driven in the state where the vibrating element 140 is bonded to the surface on the Z-axis negative direction side. In the embodiment, the top panel 120 is vibrated at the natural vibration frequency of the top panel 120 to generate standing waves in the top panel 120. However, since the vibrating element 140 is bonded to the top panel 120, it is practically preferable to determine the natural vibration frequency in consideration of the weight of the vibrating element 140 and the like.

The vibrating element 140 is bonded to the surface of the top panel 120 on the Z-axis negative direction side along the short side extending in an X-axis direction on a Y-axis positive direction side. The vibrating element 140 is only required to be an element capable of generating vibration in the ultrasonic band, and for example, an element including a piezoelectric element, such as a piezo element, can be used.

The vibrating element 140 is driven by a first drive signal output from a drive control unit to be described below. The amplitude (intensity) and the frequency of vibration generated by the vibrating element 140 are set by the first drive signal. Furthermore, on/off of the vibrating element 140 is controlled by the first drive signal.

Note that the ultrasonic band refers to a frequency band of about 20 kHz or more, for example. In the electronic device 100 according to the embodiment, the frequency at which the vibrating element 140 vibrates is equal to the frequency of the top panel 120, whereby the vibrating element 140 is driven by the first drive signal to vibrate at the natural frequency of the top panel 120.

Furthermore, the vibrating element 140 is sometimes driven by a second drive signal. In this case, the amplitude (intensity) and frequency of vibration generated by the vibrating element 140 are set by the second drive signal, and on/off of the vibrating element 140 is controlled by the second drive signal. In the case where the vibrating element 140 is driven by the second drive signal, natural vibration in a vibration mode different from the case where the vibrating element 140 is driven by the first drive signal is generated in the top panel 120.

The touch panel 150 is disposed on the display panel 160 (Z-axis positive direction side) and under the top panel 120 (Z-axis negative direction side). The touch panel 150 is an example of a coordinate detection unit that detects a position (hereinafter referred to as operational input position) at which the user of the electronic device 100 touches the top panel 120.

Various buttons and the like using the GUI (hereinafter referred to as GUI operation portion) are displayed on the display panel 160 under the touch panel 150. Accordingly, the user of the electronic device 100 normally touches the top panel 120 with the fingertip to operate the GUI operation portion.

The touch panel 150 is only required to be a coordinate detection unit capable of detecting the position of the operational input on the top panel 120 by the user, and may be, for example, a capacitive or resistive coordinate detection unit. Here, a mode in which the touch panel 150 is a capacitive coordinate detection unit will be described. The capacitive touch panel 150 can detect operational input to the top panel 120 even if there is a gap between the touch panel 150 and the top panel 120.

Furthermore, although a mode in which the top panel 120 is disposed on the input surface side of the touch panel 150 will be described here, the top panel 120 may be integrated with the touch panel 150. In that case, the surface of the touch panel 150 serves as the surface of the top panel 120 illustrated in FIGS. 2 and 3, which constitutes an operation surface. Furthermore, the top panel 120 illustrated in FIGS. 2 and 3 may be omitted in the configuration. In that case as well, the surface of the touch panel 150 constitutes an operation surface. Furthermore, in that case, the member having the operation surface is only required to vibrate by the natural vibration of the member.

Furthermore, in the case where the touch panel 150 is a capacitive coordinate detection unit, the touch panel 150 may be disposed on the top panel 120. In that case as well, the surface of the touch panel 150 constitutes an operation surface. Furthermore, in the case where the touch panel 150 is a capacitive coordinate detection unit, the top panel 120 illustrated in FIGS. 2 and 3 may be omitted in the configuration. In that case as well, the surface of the touch panel 150 constitutes an operation surface. Furthermore, in that case, the member having the operation surface is only required to vibrate by the natural vibration of the member.

The display panel 160 is only required to be a display unit capable of displaying an image, such as a liquid crystal display panel and an organic electroluminescence (EL) panel, for example. The display panel 160 is disposed on the substrate 170 (Z-axis positive direction side) using a holder or the like (not illustrated) inside the recess 110A of the housing 110.

The display panel 160 is driven and controlled by a driver integrated circuit (IC) to be described later, and displays the GUI operation portion, an image, a character, a symbol, a figure, and the like depending on the operation status of the electronic device 100.

The substrate 170 is disposed inside the recess 110A of the housing 110. The display panel 160 and the touch panel 150 are disposed on the substrate 170. The display panel 160 and the touch panel 150 are fixed to the substrate 170 and the housing 110 by a holder or the like (not illustrated).

In addition to the drive control device to be described later, various circuits and the like necessary to drive the electronic device 100 are mounted on the substrate 170.

In the electronic device 100 having a configuration as described above, when the user touches the top panel 120 with the finger and movement of the fingertip is detected, the drive control unit mounted on the substrate 170 drives the vibrating element 140, and vibrates the top panel 120 at the frequency in the ultrasonic band. The frequency in the ultrasonic band is a resonant frequency of a resonance system including the top panel 120 and the vibrating element 140, which generates standing waves in the top panel 120.

By generating standing waves in the ultrasonic band, the electronic device 100 provides a tactile sensation to the user through the top panel 120.

Next, the standing waves to be generated in the top panel 120 will be described with reference to FIG. 4.

FIG. 4 (i.e., FIGS. 4A and 4B) depicts views illustrating a wave head formed in parallel to the short side of the top panel 120 among the standing waves generated in the top panel 120 by natural vibration in the ultrasonic band. FIG. 4A is a side view, and FIG. 4B is a perspective view. FIGS. 4A and 4B illustrate standing waves in the ultrasonic band generated in the top panel 120 in the case where the vibrating element 140 is driven with the first drive signal. In FIGS. 4A and 4B, XYZ coordinates similar to those in FIGS. 2 and 3 are defined. Note that FIGS. 4A and 4B illustrate the amplitude of the standing waves in an exaggerated manner for easy understanding. Furthermore, the vibrating element 140 is omitted in FIGS. 4A and 4B.

A natural frequency (resonant frequency) f of the top panel 120 is expressed by the following formulae (1) and (2) using Young's modulus E, density ρ, a Poisson's ratio δ, a long side dimension l, and a thickness t of the top panel 120, and the number of cycles k of the standing waves existing in a long side direction. Since the standing waves have the same waveform in units of ½ cycle, the number of cycles k takes values in increments of 0.5, which is 0.5, 1, 1.5, 2, and the like.

$$f = \frac{\pi k^2 t}{l^2} \sqrt{\frac{E}{3\rho(1-\delta^2)}} \quad (1)$$

$$f = \alpha k^2 \quad (2)$$

Note that a coefficient α in the formula (2) is a collective expression of coefficients other than $k^2$ in the formula (1).

For example, the standing waves illustrated in FIGS. 4A and 4B are waveforms in the case where the number of cycles k is 10. In a case where Gorilla (registered trademark) glass having a long side length l of 142 mm, a short side length of 80 mm, and the thickness t of 0.7 mm is used as the top panel 120, for example, the natural frequency f is 30 kHz in a case where the number of cycles k is 10. In that case, the first drive signal having the frequency of 30 kHz is only required to be used.

The top panel 120 is a tabular member, and when the vibrating element 140 (see FIGS. 2 and 3) is driven to generate the natural vibration in the ultrasonic band, the top panel 120 is bended as illustrated in FIGS. 4A and 4(B), thereby generating standing waves in the surface 120A.

Note that, although a mode in which one vibrating element 140 is bonded along the short side extending in the X-axis direction on the Y-axis positive direction side on the surface on the Z-axis negative direction side of the top panel 120 is described here, two vibrating elements 140 may be used. In the case of using two vibrating elements 140, it is sufficient if the other one of the vibrating elements 140 is bonded along the short side extending in the X-axis direction on a Y-axis negative direction side on the surface on the Z-axis negative direction side of the top panel 120. In that case, it is sufficient if the two vibrating elements 140 are disposed to be axially symmetric with a center line parallel to the two short sides of the top panel 120 serving as a symmetry axis.

Furthermore, in the case of driving the two vibrating elements 140, the two vibrating elements 140 are only required to be driven in the same phase in a case where the number of cycles k is an integer, and the vibrating elements 140 are only required to be driven in opposite phases in a case where the number of cycles k is a decimal (a number including an integer part and a decimal part).

Next, the natural vibration in the ultrasonic band generated in the top panel 120 of the electronic device 100 will be described with reference to FIG. 5.

FIG. 5 (i.e., FIGS. 5A and 5B) depicts diagrams illustrating a state in which a dynamic friction force applied to a fingertip performing operational input changes due to the natural vibration in the ultrasonic band generated in the top panel 120 of the electronic device 100. In FIGS. 5A and 5B, the user is performing, while touching the top panel 120 with the fingertip, operational input of moving the finger along the arrow from the back side to the front side of the top panel 120. Note that the vibration is turned on/off by the vibrating element 140 (see FIGS. 2 and 3) being turned on/off.

Furthermore, in FIGS. 5A and 5B, the range touched by the finger while the vibration is off is illustrated in gray, and the range touched by the finger while the vibration is on is illustrated in white in the depth direction of the top panel 120.

While the natural vibration in the ultrasonic band is generated in the entire top panel 120 as illustrated in FIGS. 4A and 4B, FIGS. 5A and 5B illustrate operation pattern of switching on/off of the vibration while the user's finger moves from the back side to the front side of the top panel 120.

Accordingly, in FIGS. 5A and 5B, the range touched by the finger while the vibration is off is illustrated in gray, and the range touched by the finger while the vibration is on is illustrated in white in the depth direction of the top panel 120.

In the operation pattern illustrated in FIG. 5A, the vibration is off when the user's finger is on the back side of the top panel 120, and the vibration is turned on while the finger moves to the front side.

On the other hand, in the operation pattern illustrated in FIG. 5B, the vibration is on when the user's finger is on the back side of the top panel 120, and the vibration is turned off while the finger moves to the front side.

Here, when the natural vibration in the ultrasonic band is generated in the top panel 120, an air layer based on the squeeze effect is interposed between the surface 120A of the top panel 120 and the finger, and a dynamic friction coefficient of when the finger traces the surface 120A of the top panel 120 decreases.

Accordingly, in FIG. 5A, the dynamic friction force applied to the fingertip is large in the range illustrated in gray on the back side of the top panel 120, and the dynamic friction force applied to the fingertip is small in the range illustrated in white on the front side of the top panel 120.

Accordingly, as illustrated in FIG. 5A, the user who performs operational input to the top panel 120 senses a decrease in the dynamic friction force applied to the fingertip when the vibration is turned on, and perceives the ease of slipping of the fingertip. At this time, with the surface 120A of the top panel 120 being smoother, the user feels that a recess exists on the surface 120A of the top panel 120 when the dynamic friction force decreases.

On the other hand, in FIG. 5B, the dynamic friction force applied to the fingertip is small in the range illustrated in white on the back front side of the top panel 120, and the dynamic friction force applied to the fingertip is large in the range illustrated in gray on the front side of the top panel 120.

Accordingly, as illustrated in FIG. 5B, the user who performs operational input to the top panel 120 senses an increase in the dynamic friction force applied to the fingertip when the vibration is turned off, and perceives a hard-to-slip sense of the fingertip or the feeling of being caught. Then, since the fingertip becomes less slippery, it feels as if a projection exists on the surface 120A of the top panel 120 when the dynamic friction force increases.

As described above, the user can feel the unevenness with the fingertip in the case of FIGS. 5A and 5B. Perception of unevenness by a person in this manner is disclosed in, for example, "Print Transfer Method for Tactile Design and Sticky-band Illusion" (*Papers of 11th Annual Conference of the Society of Instrument and Control Engineers* (SICE) *System Integration Division* (SI2010, Sendai), 174-177, 2010-12). Furthermore, the perception of unevenness by a person is also disclosed in "Fishbone Tactile Illusion" (*Papers of 10th Annual Conference of the Virtual Reality Society of Japan* (*VRSJ*) (September 2005)).

Note that, here, the change in the dynamic friction force in the case of switching on/off of vibration has been described. This similarly applies to a case of changing the amplitude (intensity) of the vibrating element 140.

Next, a configuration of the electronic device 100 according to the embodiment will be described with reference to FIG. 6.

Figure 6:
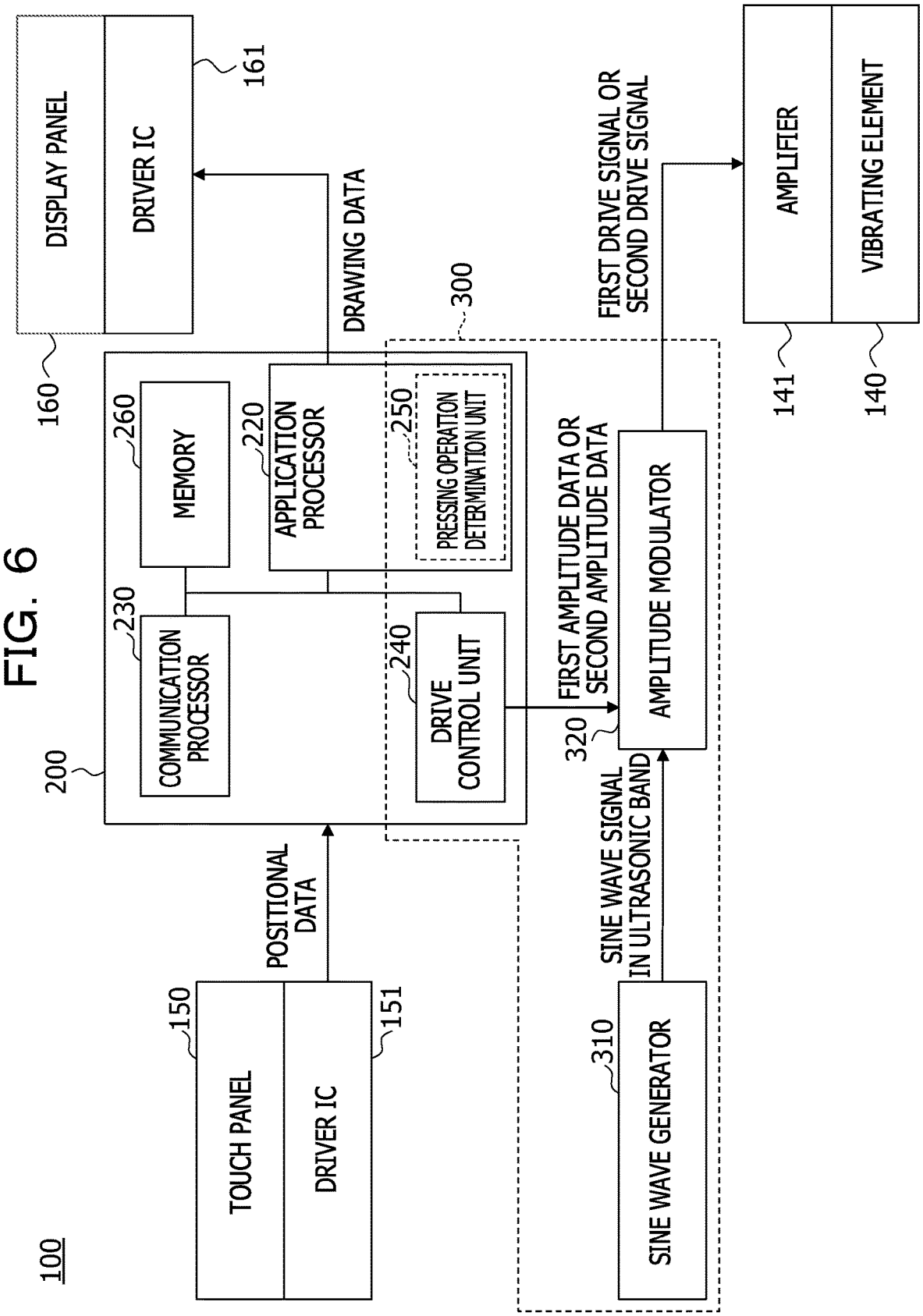
FIG. 6 is a diagram illustrating a configuration of the electronic device according to the embodiment.

FIG. 6 is a diagram illustrating a configuration of the electronic device 100 according to an embodiment.

The electronic device 100 includes the vibrating element 140, an amplifier 141, the touch panel 150, a driver integrated circuit (IC) 151, the display panel 160, a driver IC 161, a control unit 200, a sine wave generator 310, and an amplitude modulator 320.

The control unit 200 includes an application processor 220, a communication processor 230, a drive control unit 240, a pressing operation determination unit 250, and a memory 260. The control unit 200 is implemented by, for example, an IC chip. The pressing operation determination unit 250 is included in the application processor 220.

Furthermore, the drive control unit 240, the pressing operation determination unit 250, the sine wave generator 310, and the amplitude modulator 320 constitute a drive control device 300. Note that, here, a mode in which the application processor 220, the communication processor 230, the drive control unit 240, the pressing operation determination unit 250, and the memory 260 are implemented by the one control unit 200 will be described. However, the drive control unit 240 may be separately provided as another IC chip or processor outside the control unit 200. In that case, it is sufficient if, among data stored in the memory 260, data necessary for the drive control of the drive control unit 240 is stored in a memory different from the memory 260 and provided inside the drive control device 300.

In FIG. 6, the housing 110, the top panel 120, the double-sided tape 130, and the substrate 170 (see FIG. 2) are omitted. Furthermore, here, the amplifier 141, the driver IC 151, the driver IC 161, the drive control unit 240, the memory 260, the sine wave generator 310, and the amplitude modulator 320 will be described.

The amplifier 141 is disposed between the drive control device 300 and the vibrating element 140, and amplifies the first drive signal or the second drive signal output from the drive control device 300 to drive the vibrating element 140.

The driver IC 151 is connected to the touch panel 150, detects positional data indicating a position at which operational input to the touch panel 150 has been made, and outputs the positional data to the control unit 200. As a result, the positional data is input to the application processor 220 and the drive control unit 240. Note that inputting positional data to the drive control unit 240 is equivalent to inputting positional data to the drive control device 300.

The driver IC 161 is connected to the display panel 160, inputs drawing data output from the drive control device 300 to the display panel 160, and causes the display panel 160 to display an image based on the drawing data. Accordingly, the GUI operation portion, an image based on the drawing data, or the like is displayed on the display panel 160.

The application processor 220 has an operating system (OS) of the electronic device 100 installed therein, and performs processing for executing various applications of the electronic device 100. The application processor 220 includes the pressing operation determination unit 250.

The communication processor 230 executes a process necessary for the electronic device 100 to perform communication, such as 3rd generation (3G), 4th generation (4G), long term evolution (LTE), and Wi-Fi.

When providing a tactile sensation using the squeeze effect, the drive control unit 240 outputs first amplitude data to the amplitude modulator 320 in a case where two predetermined conditions are met. The first amplitude data is data indicating an amplitude value for adjusting the strength of the first drive signal used for driving the vibrating element 140 when providing a tactile sensation using the squeeze effect. As an example, the first amplitude data is digital data indicating the amplitude value for adjusting the strength of the first drive signal at the frequency of 350 Hz.

The amplitude value is set according to the degree of temporal change in the positional data. Here, as the degree of temporal change in the positional data, a speed at which the user's fingertip moves along the surface 120A of the top panel 120 is used. The moving speed of the user's fingertip is calculated by the drive control unit 240 on the basis of the degree of temporal changes in the positional data input from the driver IC 151.

Furthermore, the drive control device 300 according to the embodiment vibrates the top panel 120 to change the dynamic friction force applied to the user's fingertip when the fingertip moves along the surface 120A of the top panel 120. Since the dynamic friction force is generated while the fingertip is moving, the drive control unit 240 vibrates the vibrating element 140 when the moving speed becomes equal to or higher than a predetermined threshold speed. It is the first predetermined condition that the moving speed becomes equal to or higher than the predetermined threshold speed.

Therefore, the amplitude value indicated by the first amplitude data output from the drive control unit 240 is zero when the moving speed is less than the predetermined threshold speed, and is set to a predetermined amplitude value indicating a tactile sensation when the moving speed becomes the predetermined threshold speed or higher.

Furthermore, in a case where the position of the fingertip that performs operational input is within a predetermined area where vibration is to be generated, the drive control device 300 according to the embodiment outputs the first amplitude data to the amplitude modulator 320. It is the second predetermined condition that the position of the fingertip that performs operational input is within the predetermined area where the vibration is to be generated.

It is determined whether the position of the fingertip that performs operational input is within the predetermined area where the vibration is to be generated on the basis of whether or not the position of the fingertip that performs operational input is inside the predetermined area where the vibration is to be generated.

Here, the position on the display panel 160, such as the GUI operation portion to be displayed on the display panel 160, an area for displaying an image, and an area representing the entire page, is specified by area data indicating the area. The area data exists for all GUI operation portions displayed on the display panel 160, areas for displaying an image, or areas representing the entire page in all applications.

Therefore, when it is determined whether the position of the fingertip that performs operational input is within the predetermined area where the vibration is to be generated as the second predetermined condition, a type of the application being activated by the electronic device 100 has relations. This is because the display on the display panel 160 differs depending on the type of the application.

Furthermore, it is because a type of operational input of moving the fingertip touching the surface 120A of the top panel 120 differs depending on the type of the application. As a type of operational input of moving the fingertip touching the surface 120A of the top panel 120, for example, there is what is called flick operation when the GUI operation portion is operated. The flick operation is operation of moving the fingertip along the surface 120A of the top panel 120 for a relatively short distance in a manner of flicking (snapping) the surface.

Furthermore, in a case of page turning, swipe operation is performed, for example. The swipe operation is operation of moving the fingertip along the surface 120A of the top panel 120 for a relatively long distance in a manner of sweeping the surface. The swipe operation is performed in a case of turning a photo, for example, in addition to the page turning. Furthermore, in a case where a slider (see the slider 102B in FIG. 1) is slid by the GUI operation portion, drag operation of dragging the slider is performed.

The operational input of moving the fingertip touching the surface 120A of the top panel 120, such as the flick operation, the swipe operation, and the drag operation given as examples here, is selectively used depending on the type of display based on the application. Therefore, when determining whether the position of the fingertip that performs the operational input is within the predetermined area where the vibration is to be generated, the type of the application being activated by the electronic device 100 is related.

The drive control unit 240 determines, using the area data, whether or not the position indicated by the positional data input from the driver IC 151 is inside the predetermined area where the vibration is to be generated.

Data to be stored in the memory 260, in which data indicating the type of the application, area data indicating the GUI operation portion or the like on which the operational input is made, and pattern data indicating a vibration pattern are associated with one another, is stored in the memory 260.

The two predetermined conditions necessary for outputting the first amplitude data to the amplitude modulator 320 when the drive control unit 240 provides a tactile sensation using the squeeze effect are the moving speed of the fingertip being equal to or higher than the predetermined threshold speed, and coordinates representing the position of the operational input being inside the predetermined area where the vibration is to be generated.

When providing a tactile sensation using the squeeze effect, the drive control unit 240 reads the first amplitude data indicating the amplitude value from the memory 260 and outputs the first amplitude data to the amplitude modulator 320 in the case where the moving speed of the fingertip is equal to or higher than the predetermined threshold speed, and the coordinates of the operational input are inside the predetermined area where the vibration is to be generated.

Furthermore, the drive control unit 240 outputs second amplitude data for providing a tactile sensation having a click feeling to the amplitude modulator 320 when the pressing operation determination unit 250 determines that an operation to press the surface 120A of the top panel 120 has been performed in a display area of a predetermined GUI operation portion.

The second amplitude data is data indicating an amplitude value for adjusting the strength of the second drive signal used for driving the vibrating element 140 when providing the tactile sensation having a click feeling. The amplitude value of the second amplitude data is set to a predetermined value. The second amplitude data is digital data indicating the amplitude value for adjusting the strength of the second drive signal at the frequency of 29.65 kHz. Note that 29.65 kHz is an example of a second frequency.

The pressing operation determination unit 250 is included in the application processor 220. The pressing operation determination unit 250 represents part of functions implemented by the OS of the application processor 220.

The pressing operation determination unit 250 outputs a pressing event when the operation to press the top panel 120 in the area where the predetermined GUI operation portion is displayed. The pressing event is a signal indicating that the operation to press the top panel 120 has been performed in the area where the predetermined GUI operation portion is displayed.

Furthermore, the predetermined GUI operation portion is a GUI operation portion that receives a pressing operation, like the GUI operation portion representing an image of a button, for example. The area where the predetermined GUI operation portion is an area where the GUI operation portion that receives the pressing operation is displayed, like the GUI operation portion representing an image of a button.

The pressing event is used when the application processor 220 executes the various applications of the electronic device 100, and is also input to the drive control unit 240 and used when the drive control unit 240 drives the vibrating element 140 in a second vibration pattern.

The memory 260 stores the data in which the data indicating the type of the application, the area data indicating the GUI operation portion or the like on which the operational input is made, and the pattern data indicating a first vibration pattern are associated with one another. Furthermore, the memory 260 stores the data in which the data indicating the type of the application, the area data indicating the GUI operation portion or the like on which the operational input is made, and the pattern data indicating the second vibration pattern are associated with one another. The first vibration pattern and the second vibration pattern will be described below.

Furthermore, the memory 260 stores data and programs necessary for the application processor 220 to execute an application, data and programs necessary for the communication processor 230 to perform communication processing, and the like.

The sine wave generator 310 generates a sine wave necessary for generating the first drive signal and the second drive signal for causing the top panel 120 to vibrate at the natural frequency. For example, in a case where the top panel 120 is caused to vibrate at the natural frequency f of 30 kHz, the frequency of the sine wave is 30 kHz. The sine wave generator 310 inputs a sine wave signal in the ultrasonic band to the amplitude modulator 320. 30 kHz is an example of a first frequency.

The sine wave signal generated by the sine wave generator 310 is an alternating reference signal to be a basis of the first drive signal and the second drive signal for generating the natural vibration in the ultrasonic band, and has a constant frequency and a constant phase. The sine wave generator 310 inputs a sine wave signal in the ultrasonic band to the amplitude modulator 320.

Note that, although a mode of using the sine wave generator 310 that generates a sine wave signal will be described here, the signal may not be the sine wave signal. For example, a signal having a waveform in which rising and falling waveforms of a clock are blunted may be used. Therefore, a signal generator that generates an alternating-current signal in the ultrasonic band may be used instead of the sine wave generator 310.

The amplitude modulator 320 modulates, using the amplitude data input from the drive control unit 240, the amplitude of the sine wave signal input from the sine wave generator 310 to generate the first drive signal and the second drive signal. The amplitude modulator 320 modulates only the amplitude of the sine wave signal in the ultrasonic band input from the sine wave generator 310 to generate the first drive signal and the second drive signal without modulating the frequency and the phase.

Therefore, the first drive signal and the second drive signal output from the amplitude modulator 320 are sine wave signals in the ultrasonic band obtained by modulating only the amplitude of the sine wave signal in the ultrasonic band input from the sine wave generator 310. Note that the amplitude of the first drive signal and the second drive signal is zero in the case where the amplitude data is zero. This is equivalent to a state in which the amplitude modulator 320 does not output drive signals. Furthermore, the first drive signal and the second drive signal are not generated at the same time, and either one is generated according to the state of the operational input.

Next, data to be stored in the memory 260 will be described with reference to FIGS. 7 and 8. FIGS. 7 and 8 are tables illustrating data to be stored in the memory 260.

The data illustrated in FIG. 7 is first data in which the data indicating the type of the application, the area data indicating a coordinate value of an area where the GUI operation portion or the like on which the operational input is made is displayed, and the pattern data indicating the first vibration pattern are associated with one another.

The first vibration pattern is a vibration pattern used for causing the vibrating element 140 to vibrate when the user moves the fingertip while touching the top panel 120, and is used for generating the first drive signal. The first vibration pattern is pattern data in which the first amplitude data used for generating the first drive signal is arrayed in time series. The first amplitude data is arrayed at 350 kHz in a time axis direction, for example.

The first vibration pattern is a vibration pattern used for providing a tactile sensation by reducing the dynamic friction coefficient applied to the fingertip that traces the surface 120A of the top panel 120 using the squeeze effect and changing the strength of vibration.

FIG. 7 illustrates an application identification (ID) as the data indicating the type of the application. Furthermore, formulae f1 to f4 representing the coordinate value of the area where the GUI operation portion or the like on which the operational input is made is displayed are illustrated as the area data. Furthermore, P1 to P4 are illustrated as the pattern data indicating the first vibration pattern.

Note that the application indicated by the application ID included in the data stored in the memory 260 includes all of applications that can be used on a smartphone terminal or a tablet computer, and also includes an email editing mode.

Furthermore, FIG. 8 illustrates second data in which the data indicating the type of the application, the area data indicating a coordinate value of an area where the GUI operation portion or the like on which the operational input is made is displayed, and the pattern data indicating the second vibration pattern are associated with one another.

The second vibration pattern is a vibration pattern used for causing the vibrating element 140 to vibrate when pressing the top panel 120 with the fingertip in the display area of the predetermined GUI operation portion from a state where the user does not touch the top panel 120 with the fingertip, and is used for generating the second drive signal. The second vibration pattern is pattern data in which the second amplitude data used for generating the second drive signal is arrayed in time series. The second amplitude data is arrayed at 29.65 kHz in the time axis direction, for example.

By the modulator 320 modulating the sine wave signal generated by the sine wave generator 310 in the second vibration pattern, a click feeling received by the fingertip when the user presses a metal dome-type button is simulated.

Such a click feeling can be realized by, for example, driving a linear resonant actuator (LRA) with a drive signal having an audible-range frequency. However, since the electronic device 100 includes the vibrating element 140 that is driven at the frequency in the ultrasonic band, the electronic device 100 includes the data illustrated in FIG. 8 including the second vibration pattern in the memory 260 in order to cause the vibrating element 140 to vibrate to provide the tactile sensation having a click feeling.

If the tactile sensation having a click feeling can be provided by vibration of the vibrating element 140, adding an actuator like an LRA becomes unnecessary. In particular, in a case where the electronic device 100 is a portable terminal device, increasing the number of components is not realistic from the viewpoint of space constraints and the like, and thus the electronic device 100 provides the tactile sensation having a click feeling by driving the vibrating element 140 with the second drive signal in the ultrasonic band.

FIG. 8 illustrates application identification (ID) as the data indicating a type of the application. In addition, formulae f11 to f14 representing a coordinate value of the area where the GUI operation portion or the like on which operational input is made is displayed are illustrated as the area data. Furthermore, P11 to P14 are illustrated as the pattern data indicating the second vibration pattern. The application ID is similar to the application ID illustrated in FIG. 7.

Next, amplitudes and gains of the first drive signal and the second drive signal will be described with reference to FIGS. 9 and 10. FIGS. 9 and 10 are graphs respectively illustrating frequency characteristics of amplitudes and gains of the first drive signal and the second drive signal. The gain is obtained by Fourier transformation of the amplitude.

The first drive signal is a drive signal obtained by modulating the sine wave signal of 30 kHz generated by the sine wave generator 310 with the first amplitude data of 350 Hz by the modulator 320. The first amplitude data of 350 Hz is amplitude data in which the amplitude sinusoidally changes at 350 Hz, and the modulation frequency is 350 Hz. For this reason, as illustrated in the upper side in FIG. 9, the amplitude of the first drive signal changes with a cycle of 350 Hz as illustrated by the envelope.

As illustrated in the lower side in FIG. 9, the gain of the first drive signal is obtained as a 30 kHz component, a 29.65 kHz component, and a 30.35 kHz component. This means that the 29.65 kHz component lower by 350 Hz and the 30.35 kHz component higher by 350 Hz are obtained around the sine wave signal of 30 kHz as a carrier wave.

The tactile sensation using the squeeze effect is provided by stimulating the tactile receptor of the fingertip using the 29.65 kHz component lower by 350 Hz and the 30.35 kHz component higher by 350 Hz to the sine wave signal of 30 kHz that is the ultrasonic band, when the fingertip of the user moves while tracing the top panel 120. The tactile sensation using the squeeze effect is an active tactile sensation provided in the state where the fingertip of the user is moving.

The tactile receptor of the fingertip is a Meissner corpuscle, a Pacinian corpuscle, a Merkel touch panel, or the like, and has sensitivity in a band of about 150 Hz to about 400 Hz. Therefore, the tactile sensation using the squeeze effect can be provided to the sine wave signal of 30 kHz as the ultrasonic band by using the 29.65 kHz component lower by 350 Hz and the 30.35 kHz component higher by 350 Hz.

Furthermore, the second drive signal is a drive signal obtained by modulating the sine wave signal of 30 kHz generated by the sine wave generator 310 with the second amplitude data of 29.65 kHz by the modulator 320. The second amplitude data of 29.65 kHz is amplitude data in which the amplitude sinusoidally changes at 29.65 kHz, and the modulation frequency is 29.65 kHz. Therefore, as illustrated in the upper side in FIG. 10, the second drive signal has a waveform obtained by synthesizing the sine wave signal of 30 kHz and the sine wave amplitude data of 29.65 kHz. The amplitude of such a synthesized wave (second drive signal) changes at the cycle of 350 Hz.

Therefore, as illustrated in the lower side in FIG. 10, the gain of the second drive signal is obtained as a 30 kHz component, a 350 Hz component, and a 59.65 kHz component. Therefore, when the vibrating element 140 is driven with the second drive signal, the top panel 120 generates the natural vibration of 350 Hz and the natural vibration of 30 kHz.

As described above, the 350 Hz component can be obtained with the second drive signal. Therefore, the vibration of 350 Hz can be generated in the top panel 120 by driving the vibrating element 140 with the second drive signal, and the vibration can be given to the fingertip in the state where the user holds the fingertip without moving the fingertip touching the top panel 120. This is because the frequency of the vibration is 350 Hz and is the frequency that can be sensed by the tactile receptor of the fingertip, and thus the click feeling received by the fingertip when the user presses the metal dome-type button is pressed can be simulated. Such a tactile sensation representing a click feeling is a passive tactile sensation provided in the state where the fingertip of the user is stationary.

Note that, as an example, the natural vibration of 350 Hz is a third mode in a plurality of natural vibrations that can occur in the top panel 120, and the natural vibration of 30 kHz is a 28th mode.

Figure 11:
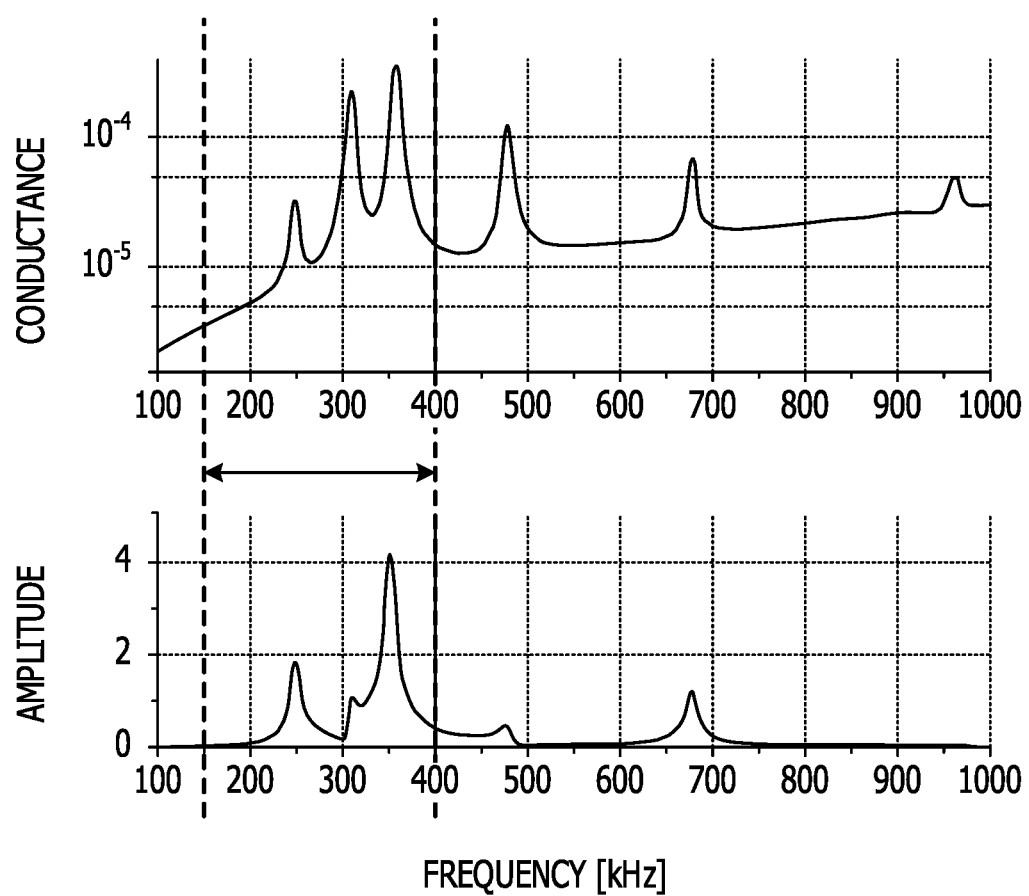
FIG. 11 is a graph illustrating a conductance of a vibrating element bonded to the top panel and an amplitude of mechanical vibration of the top panel.
Figure 12:
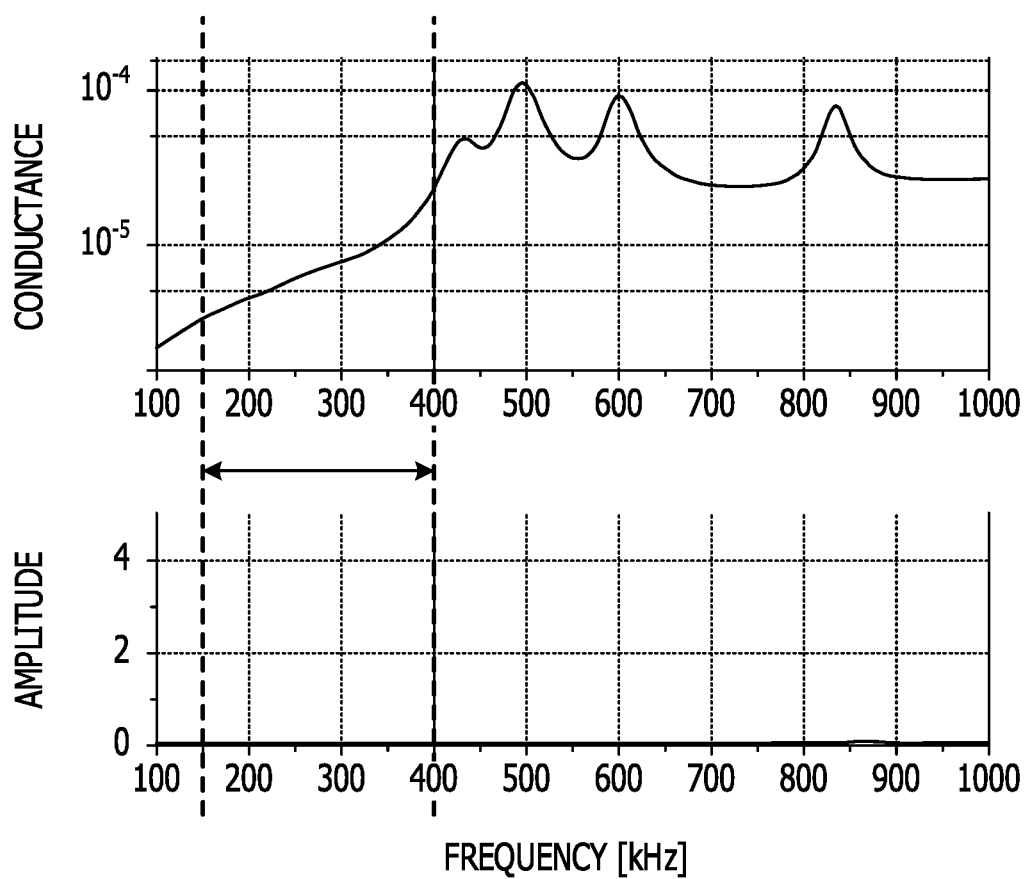
FIG. 12 is a graph illustrating a conductance of a vibrating element bonded to the top panel and an amplitude of mechanical vibration of the top panel.

Next, a difference in vibration characteristics depending on the thickness of the top panel 120 will be described. FIG. 11 is a graph illustrating a conductance and an amplitude of the vibrating element 140 in a case where the thickness of the top panel 120 is 0.3 mm. FIG. 12 is a graph illustrating a conductance and an amplitude of the vibrating element 140 in a case where the thickness of the top panel 120 is 0.55 mm. The conductance of the vibrating element 140 represents strength of mechanical resonance.

Note that, here, the dimension of the top panel 120 in the Y-axis direction is 142 mm. Furthermore, FIGS. 11 and 12 illustrate a band of 150 Hz to 400 Hz in which the tactile receptor of the fingertip has sensitivity by the broken lines and the arrows.

As illustrated in FIG. 11, in the case where the thickness of the top panel 120 is 0.3 mm, the conductance peaks at 250 Hz, 300 Hz, and 350 Hz and the amplitude peaks at 250 Hz and 350 Hz in the band of 150 Hz to 400 Hz. Since the peaks at 350 Hz are particularly high, it can be confirmed that the natural vibration of 350 Hz has been generated.

As illustrated in FIG. 12, in the case where the thickness of the top panel 120 is 0.55 mm, no peak can be obtained in the conductance, and the conductance peaks are about 500 Hz, about 600 Hz, and about 840 Hz in the band of 150 Hz to 400 Hz. Furthermore, no peak has been obtained in the amplitude.

Thus, it has been found that the natural vibration is excited in the case where the thickness of the top panel 120 is 0.3 mm, as compared with the case where the thickness of the top panel 120 is 0.55 mm. In other words, it has been found that the natural vibration is more easily excited in a thinner top panel 120.

FIG. 13 is a diagram illustrating vibration generated in the top panel 120. FIG. 13 illustrates vibration of a primary mode by the broken line and vibration of the third mode by the solid line.

In the primary mode, one antinode is located in the center of the top panel 120 in a longitudinal direction (Y-axis direction), and both ends are nodes. Furthermore, in the third mode, the three antinodes are arrayed along the longitudinal direction of the top panel 120, and both ends are located closer to outer antinodes than to the nodes outside the both outside antinodes of the three antinodes.

Here, since the touch panel 150 and the display panel 160 (see FIG. 3) are located on the Z-axis negative direction side of the top panel 120, it is difficult to arrange the vibrating element 140 in the center of the top panel 120 in plan view, and the vibrating element 140 is arranged at an end of the top panel 120 in the Y-axis direction. For this reason, in the electronic device 100, the vibrating element 140 is arranged at the end of the top panel 120 in the Y-axis positive direction.

To generate the natural vibration in the ultrasonic band in the top panel 120, the position of the vibrating element 140 is favorably the antinode of the natural vibration or a position close to the antinode, and is not favorably the node or a position close to the node.

From such a viewpoint, use of the natural vibration of the primary mode is not favorable, and use of the natural vibration of the secondary or higher vibration mode is favorable. This is because, in the secondary or higher mode, the node of the natural vibration is not located at the end of the top panel 120 on which the vibrating element 140 is arranged, and the top panel 120 can be excited at the antinode or a position close to the antinode. In other words, the length of the top panel 120 in the Y-axis direction is only required to be a length of one or more wavelengths at the frequency sensed by the tactile receptor of a human.

For this reason, in the electronic device 100, vibration of 350 Hz generated in the top panel 120 when driven by the second drive signal is set to the third mode, as an example.

Next, a process executed by the drive control unit 240 of the drive control device 300 of the electronic device 100 according to the embodiment will be described with reference to FIG. 14.

Figure 14:
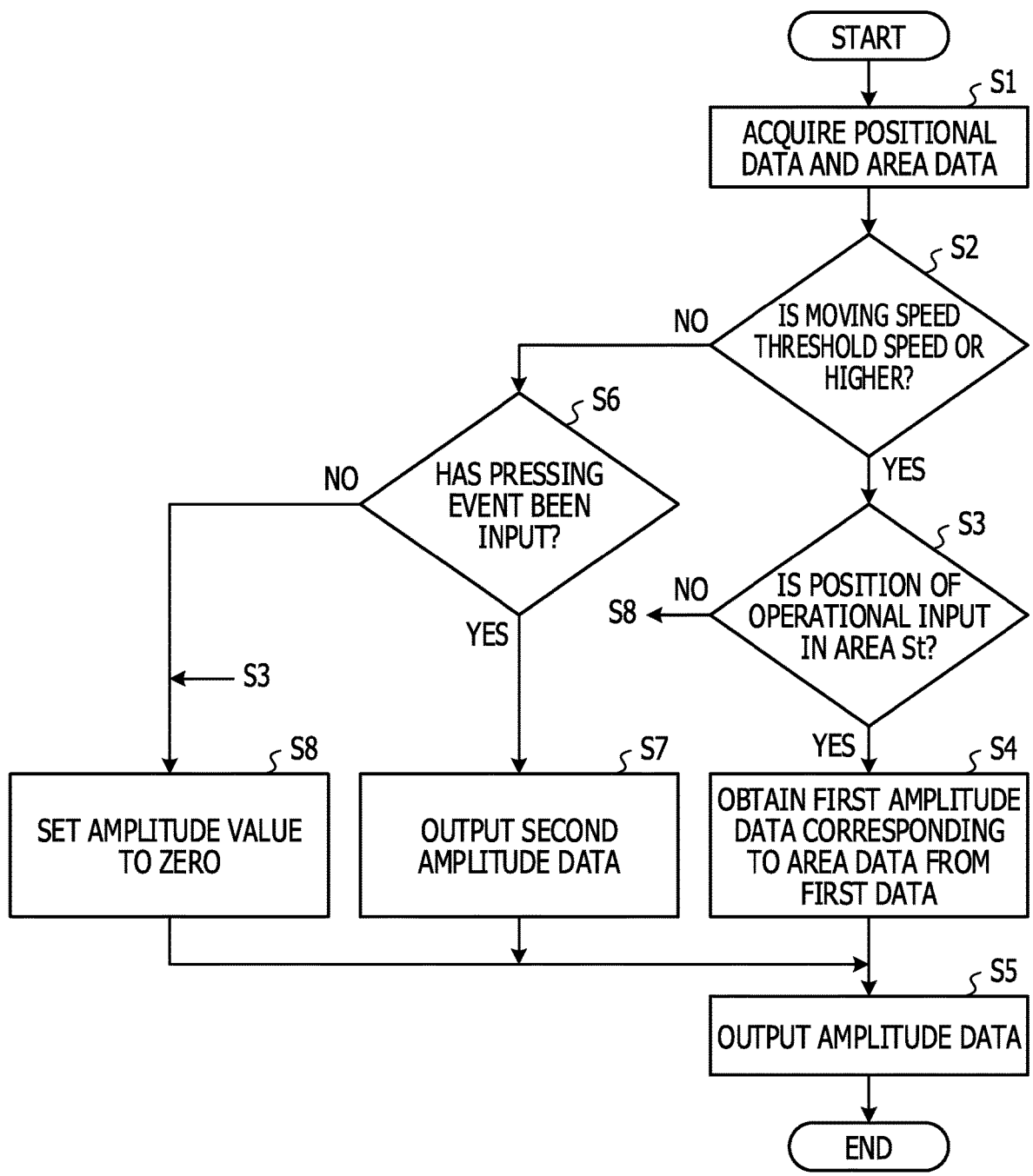
FIG. 14 is a flowchart illustrating processing executed by a drive control unit of a drive control device of the electronic device according to the embodiment.

FIG. 14 is a flowchart illustrating a process executed by the drive control unit 240 of the drive control device 300 of the electronic device 100 according to the embodiment.

The OS of the electronic device 100 executes control for driving the electronic device 100 at every predetermined control cycle. Accordingly, the drive control device 300 performs computing for each predetermined control cycle. The same applies to the drive control unit 240, and the drive control unit 240 repeatedly executes the flow illustrated in FIG. 14 for each predetermined control cycle.

The drive control unit 240 starts the process when the power of the electronic device 100 is turned on.

The drive control unit 240 obtains area data associated with the vibration pattern for the GUI operation portion on which the current operational input is being made according to the coordinates indicated by the current positional data and the type of the current application (step S1).

The drive control unit 240 determines whether or not the moving speed is equal to or higher than a predetermined threshold speed (step S2). It is sufficient if the moving speed is calculated by vector operation. Note that it is sufficient if the threshold speed is set as the minimum speed of the moving speed of the fingertip at the time when the operational input is made while moving the fingertip, such as what is called flick operation, swipe operation, and drag operation. Such a minimum speed may be set on the basis of experimental results, or may be set according to resolution of the touch panel 150 or the like.

In a case where the drive control unit 240 determines that the moving speed is equal to or higher than the predetermined threshold speed in step S2, the drive control unit 240 determines whether or not the position of the operational input is within an area St indicated by the area data obtained in step S1 (step S3).

In a case where the drive control unit 240 determines that the position of the operational input is within the area St indicated by the area data obtained in step S1, the drive control unit 240 obtains the first amplitude data corresponding to the area data from the first data (step S4).

The drive control unit 240 outputs the first amplitude data (step S5). Thereby, the amplitude modulator 320 modulates the amplitude of the sine wave output from the sine wave generator 310 according to the amplitude value of the first amplitude data to generate the first drive signal, and the vibrating element 140 is driven.

Furthermore, in a case where the drive control unit 240 determines that the moving speed is not equal to or higher than the predetermined threshold speed in step S2 (S2: NO), the drive control unit 240 determines whether or not the pressing event has been input (step S6). Determining whether or not the pressing event has been input is determining whether or not the operation to press the top panel 120 has been performed within the area where the predetermined GUI operation portion is displayed.

When the drive control unit 240 determines that the pressing event has been input (S6: YES), the drive control unit 240 outputs the second amplitude data (step S7). Thereby, the amplitude modulator 320 modulates the amplitude of the sine wave output from the sine wave generator 310 according to the amplitude value of the second amplitude data to generate the second drive signal.

The drive control unit 240 outputs the second amplitude data (step S5). Thereby, the amplitude modulator 320 modulates the amplitude of the sine wave output from the sine wave generator 310 according to the amplitude value of the second amplitude data to generate the second drive signal, and the vibrating element 140 is driven.

Since the second drive signal is a drive signal simulating the click feeling received by the fingertip when the user presses the metal dome-type button, the vibration simulating the click feeling is generated in the top panel 120 as the vibrating element 140 is driven. As a result, the user feels a click in the fingertip.

Furthermore, in step S3, in a case where the drive control unit 240 determines that the position of the operational input is not within the area St indicated by the area data obtained in step S1 (S3: NO) and, in step S6, in a case where the drive control unit 240 determines that the pressing event has not been input (S6: NO), the drive control unit 240 sets the amplitude value to zero (step S8).

The drive control unit 240 outputs the amplitude data having the amplitude value of zero (step S5). As a result, the drive control unit 240 outputs the amplitude data having the amplitude value of zero, and the amplitude modulator 320 generates the drive signals in which the amplitude of the sine wave output from the sine wave generator 310 is modulated to zero. Accordingly, the vibrating element 140 is not driven in this case.

Figure 15:
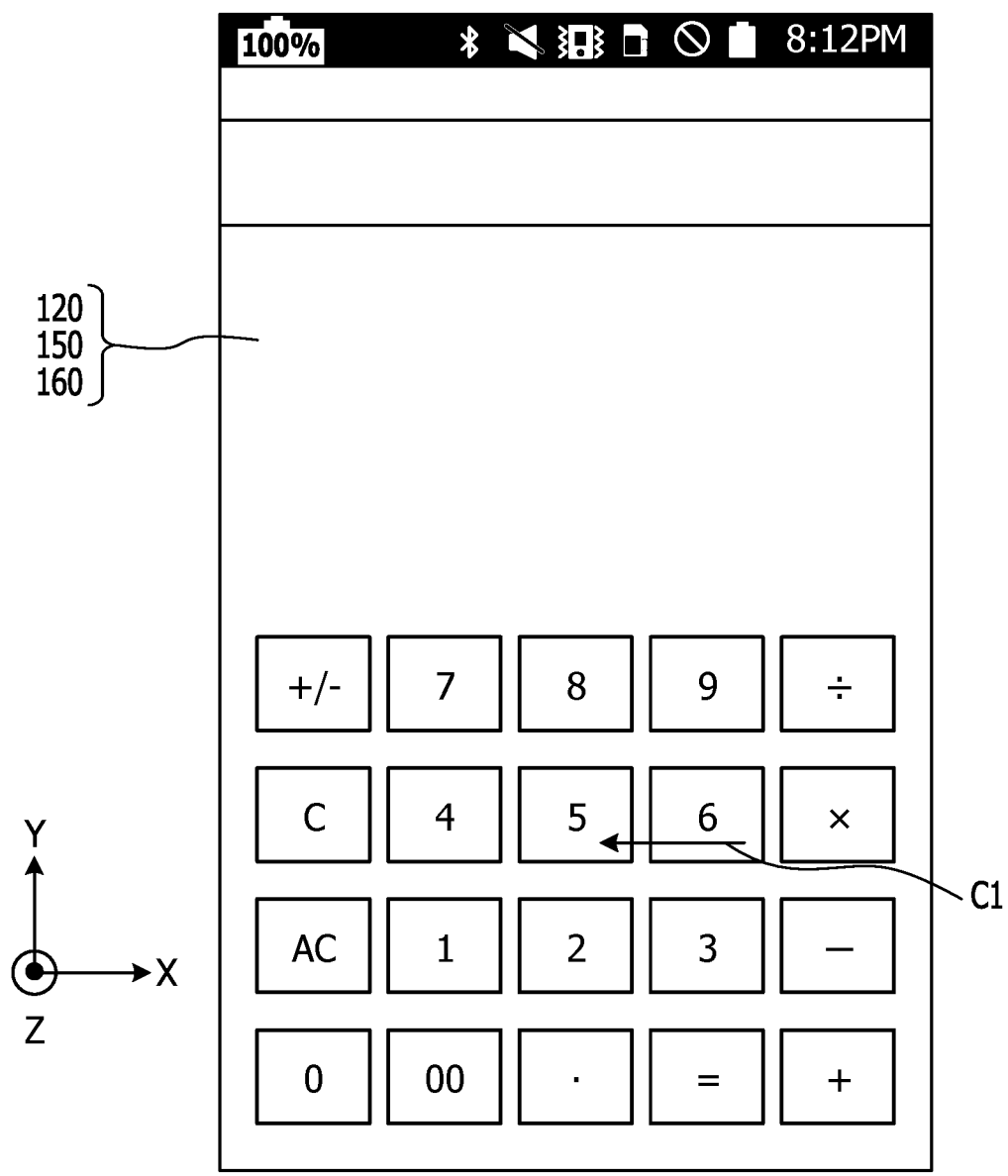
FIG. 15 is a diagram illustrating an operation example of the electronic device according to the embodiment.
Figure 16:
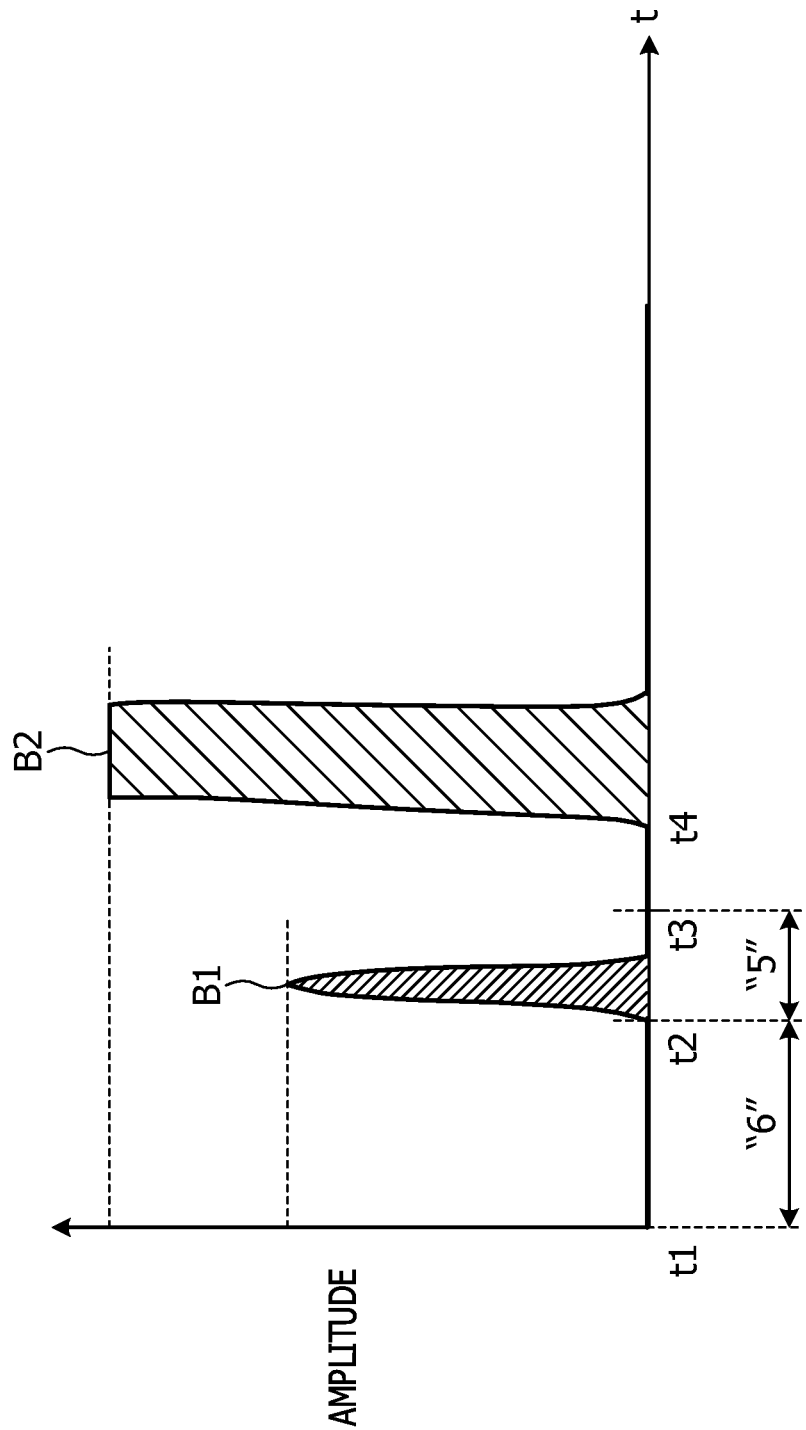
FIG. 16 is a graph illustrating an operation example of the electronic device according to the embodiment.

Next, an operation example of the electronic device 100 according to the embodiment will be described with reference to FIGS. 15 and 16. FIGS. 15 and 16 are a diagram and a graph illustrating an operation example of the electronic device 100 according to the embodiment. In FIGS. 15 and 16, XYZ coordinates similar to those in FIGS. 2 to 4 are defined.

Here, as illustrated in FIG. 15, the operation of the drive control unit 240 in a case where the operational input is performed in an operation mode where a computer application is executed will be described.

As illustrated in FIG. 15, in the operation mode in which a computer application is executed, the vibration of the top panel 120 is performed as follows, in a case where the operational input of tracing the surface 120A of the top panel 120 is performed toward a numerical "5" by the user moving the fingertip in the left direction from a state where the fingertip of the user is in contact with a numerical "6". Such an operational input is an operational input performed while the fingertip moves across a plurality of GUI operation portions in a state where the plurality of GUI operation portions is displayed side by side, unlike the flick operation, swipe operation, or drag operation.

In this case, as illustrated in FIG. 16, it is assumed that the user starts to move the fingertip touching a position C1 (see FIG. 15) on the numeral "6" at time t1. Then, the user slightly moves the fingertip from the position C1, and vibration B11 with a large amplitude is generated in a short time at time t2 where the position of the fingertip has moved out of the area of the numerical "6" and has entered the numerical "5". The vibration B11 is vibration for the squeeze effect generated with the first drive signal.

This vibration B11 is generated when the position of the fingertip moves out of the area of the numerical "6", and a low friction state in a short time where the fingertip of the user is not perceived is instantaneously transitioned to a high friction state, so that a tactile sensation that the fingertip touches a protrusion is provided to the user.

The user releases the fingertip from the top panel 120 inside the display area of the numeral "5" at time t3.

Then, at time t4, when the user presses the top panel 120 inside the display area of the numeral "5", vibration B2 with a large amplitude is generated in a short time. The vibration B2 is click feeling vibration.

As described above, when the fingertip of the user moves while touching the top panel 120, the electronic device 100 generates vibration for the squeeze effect with the first drive signal. Thereby, the tactile sensation based on the change in the dynamic friction coefficient is provided to the fingertip of the user.

Furthermore, when the fingertip of the user touches the top panel 120 within the display area of the predetermined GUI operation portion and presses the top panel 120 in the state where the fingertip is detached from the top panel 120, the electronic device 100 generates the click feeling vibration with the second drive signal. Thereby, a tactile sensation like the click feeling received by the fingertip when the user presses the metal dome-type button is provided to the fingertip of the user.

As described above, according to the electronic device 100 of the embodiment, the sine wave signal is modulated by the amplitude modulator 320 using the second amplitude data when the operation to press the surface 120A of the top panel 120 in the display area of the GUI operation portion that receives the pressing operation. The second amplitude data is data indicating the amplitude value for adjusting the strength of the second drive signal when providing the tactile sensation having a click feeling.

For this reason, a tactile sensation like the click feeling received by the fingertip when the user presses the metal dome-type button is provided to the fingertip of the user who has performed the pressing operation. The second drive signal is a drive signal for generating vibration of a frequency that can be sensed by the tactile receptor of a human in the top panel 120, using the natural vibration in the ultrasonic band of the top panel 120. As described above, since the vibration of the frequency that can be sensed by the tactile receptor of a human is generated by the natural vibration, a favorable tactile sensation with a large vibration amplitude and clearly sensed by the fingertip can be provided to the user.

Furthermore, the electronic device 100 is constructed on the basis of an electronic device that provides a tactile sensation using the squeeze effect. To provide the tactile sensation using the squeeze effect, the electronic device 100 drives the vibrating element 140 at a frequency equal to the natural vibration in the ultrasonic band of the top panel 120.

However, adding an actuator like an LRA to provide a click feeling tactile sensation in addition to the tactile sensation using the squeeze effect is not realistic from the viewpoint of space constraints and the like, particularly in the case where the electronic device 100 is a portable terminal device.

From such a viewpoint, the electronic device 100 can provide the tactile sensation having a click feeling using the vibrating element 140, the drive control unit 240, the sine wave generator 310, and the modulator 320 used for providing the tactile sensation using the squeeze effect.

In other words, the tactile sensation having a click feeling with the pressing operation is realized by additionally storing the second data including the second vibration pattern to the memory 260 and simply adding the function to detect the pressing operation within the display area of the predetermined GUI operation portion in the pressing operation determination unit 250.

In other words, the electronic device 100 that can provide the click feeling tactile sensation in addition to the tactile sensation using the squeeze effect is implemented on the basis of an electronic device that provides the tactile sensation using the squeeze effect, with the addition of a minimum number of components.

Furthermore, in the case where the user moves the fingertip touching the top panel 120, the natural vibration in the ultrasonic band of the top panel 120 is generated to change the dynamic friction force applied to the fingertip of the user. Therefore, a favorable tactile sensation can be provided to the user using the squeeze effect.

Furthermore, the electronic device 100 according to the embodiment generates the drive signals (first drive signal and second drive signal) by the amplitude modulator 320 modulating only the amplitude of the sine wave in the ultrasonic band generated in the sine wave generator 310. The frequency of the sine wave in the ultrasonic band generated by the sine wave generator 310 is equivalent to the natural frequency of the top panel 120, and the natural frequency is set in consideration of the vibrating element 140.

In other words, the electronic device 100 generates the drive signals (first drive signal and second drive signal) by the amplitude modulator 320 modulating only the amplitude without modulating the frequency or the phase of the sine wave in the ultrasonic band generated in the sine wave generator 310.

Therefore, the natural vibration in the ultrasonic band of the top panel 120 can be generated in the top panel 120, and the dynamic friction coefficient of when the surface 120A of the top panel 120 is traced with the finger can be reliably decreased using the interposition of the air layer by the squeeze effect in the case where the fingertip of the user moves while tracing the top panel 120. Furthermore, according to the Sticky-band illusion effect or the Fishbone tactile illusion effect, a favorable tactile sensation as if unevenness exists in the surface 120A of the top panel 120 can be provided to the user.

Furthermore, the mode in which on/off of the vibrating element 140 is switched to provide the user with a tactile sensation as if unevenness exists in the top panel 120 has been described above. Turning the vibrating element 140 off means that the amplitude value indicated by the first drive signal for driving the vibrating element 140 is set to zero.

However, it is not necessarily required to turn the vibrating element 140 from on to off to provide such a tactile sensation. For example, instead of the off state of the vibrating element 140, a state in which the vibrating element 140 is driven with a small amplitude may be used. For example, by reducing the amplitude to about ⅕, the tactile sensation as if unevenness exists in the top panel 120 may be provided to the user in a similar manner to the case where the vibrating element 140 is turned from on to off.

In that case, the vibrating element 140 is driven by the first drive signal that switches the strength of vibration of the vibrating element 140. As a result, the strength of the natural vibration generated in the top panel 120 is switched, and the tactile sensation as if the unevenness exists can be provided to the fingertip of the user.

If the vibrating element 140 is turned off at the time of weakening the vibration to switch the strength of the vibration of the vibrating element 140, on/off of the vibrating element 140 is to be switched. Switching on/off of the vibrating element 140 is to drive the vibrating element 140 intermittently.

As described above, according to the embodiment, the drive control device 300, the electronic device 100, and the drive control method capable of providing a favorable tactile sensation can be provided. Here, a variation of the electronic device 100 (see FIG. 3) according to the embodiment will be described with reference to FIGS. 17 to 22.

Figure 17:
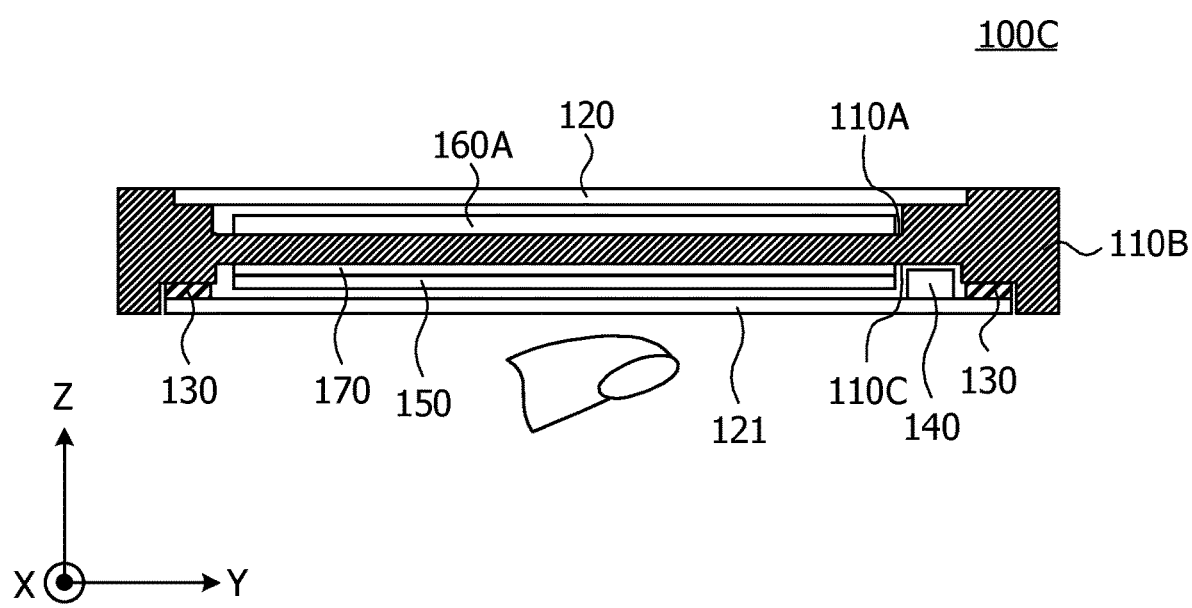
FIG. 17 is a view illustrating a cross section of an electronic device according to a first modification of the embodiment.

FIG. 17 is a view illustrating a cross section of an electronic device 100C according to a first modification of the embodiment. The cross section illustrated in FIG. 17 is a cross section corresponding to the cross section with arrows taken along line A-A illustrated in FIG. 3. In FIG. 17, the XYZ coordinate system, which is an orthogonal coordinate system, is defined in a similar manner to FIG. 3.

The electronic device 100C includes a housing 1106, the top panel 120, a panel 121, the double-sided tape 130, the vibrating element 140, the touch panel 150, a display panel 160A, and the substrate 170.

The electronic device 100C has a configuration in which the touch panel 150 of the electronic device 100 illustrated in FIG. 3 is provided on the back surface side (Z-axis negative direction side). Accordingly, compared to the electronic device 100 illustrated in FIG. 3, the double-sided tape 130, the vibrating element 140, the touch panel 150, and the substrate 170 are disposed on the back surface side.

The housing 11013 has the recess 110A on the Z-axis positive direction side, and a recess 110C on the Z-axis negative direction side. The display panel 160A is disposed inside the recess 110A, which is covered by the top panel 120. Furthermore, inside the recess 110C, the substrate 170 and the touch panel 150 are provided to overlap each other, the panel 121 is fixed to the housing 11013 with the double-sided tape 130, and the vibrating element 140 is provided on the surface of the panel 121 on the Z-axis positive direction side.

If on/off of the vibrating element 140 is switched according to operational input to the panel 121 in the electronic device 100C illustrated in FIG. 17 to generate natural vibration in the ultrasonic band in the panel 121, in a similar manner to the electronic device 100 illustrated in FIG. 3, the electronic device 100C for enabling the user to perceive, with the sense of the fingertip, the tactile sensation corresponding to an image displayed on the display panel 160 can be provided.

Note that, although FIG. 17 illustrates the electronic device 100C including the touch panel 150 provided on the back surface side, the touch panel 150 may be provided on both the front and back surface sides in combination with the structures illustrated in FIGS. 3 and 17.

Figure 18:
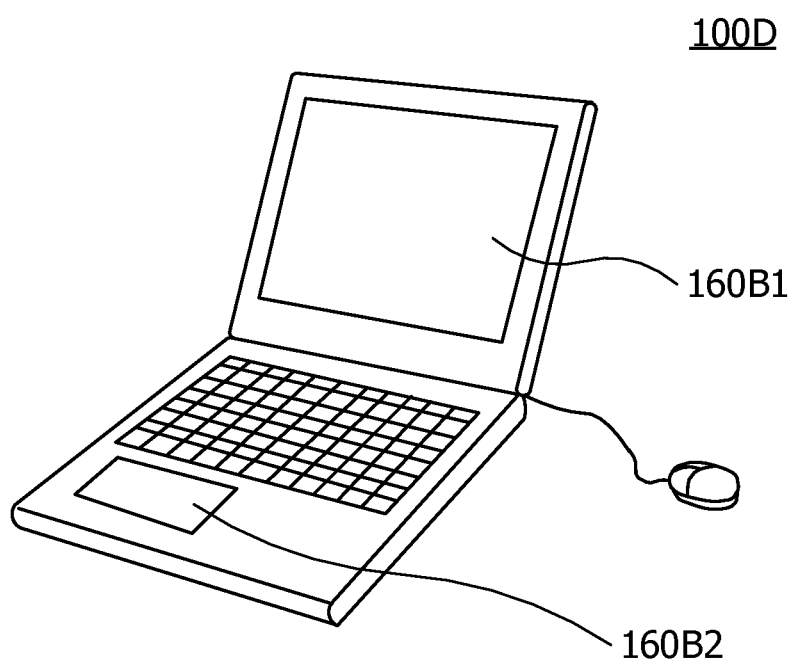
FIG. 18 is a view illustrating an electronic device according to a second modification of the embodiment.

FIG. 18 is a view illustrating an electronic device 100D according to a second modification of the embodiment. The electronic device 100D is a laptop personal computer (PC).

The PC 100D includes a display panel 160B1, and a touch pad 160B2.

Figure 19:
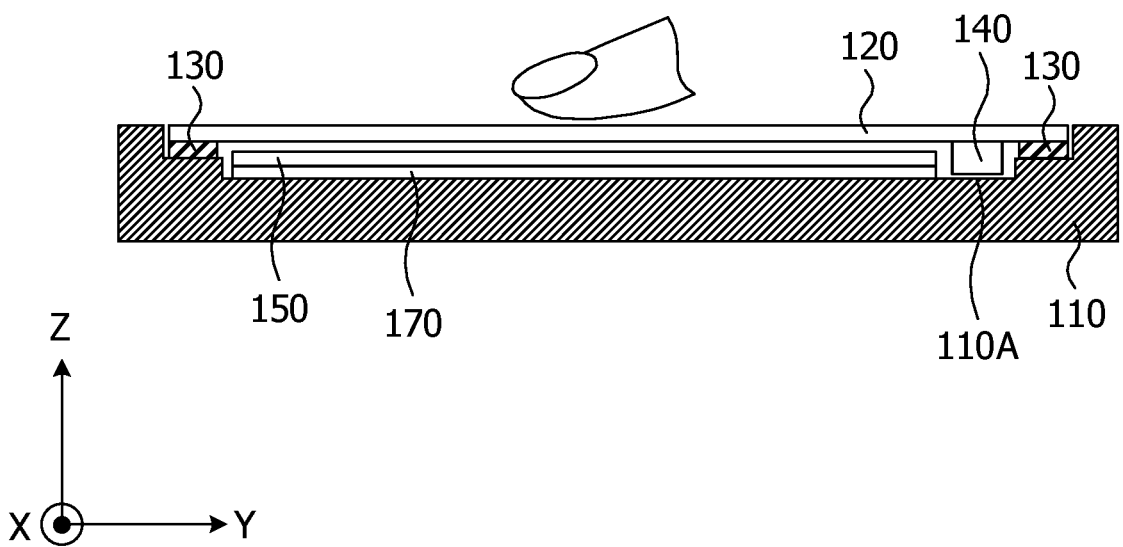
FIG. 19 is a view illustrating a cross section of a touch pad of an electronic device according to a third modification of the embodiment.

FIG. 19 is a view illustrating a cross section of the touch pad 160B2 of the electronic device 100D according to a third modification of the embodiment. The cross section illustrated in FIG. 19 is a cross section corresponding to the cross section with arrows taken along line A-A illustrated in FIG. 3. In FIG. 19, the XYZ coordinate system, which is an orthogonal coordinate system, is defined in a similar manner to FIG. 3.

The touch pad 160B2 has a configuration in which the display panel 160 is removed from the electronic device 100 illustrated in FIG. 3.

If on/off of the vibrating element 140 is switched according to operational input to the touch pad 160B2 in the electronic device 100D as a PC as illustrated in FIG. 18 to generate natural vibration in the ultrasonic band in the top panel 120, in a similar manner to the electronic device 100 illustrated in FIG. 3, an operational feeling can be provided to the fingertip of the user through the tactile sensation according to the amount of movement of the operational input to the touch pad 160B2.

Furthermore, if the vibrating element 140 is provided on the back surface of the display panel 160B1, in a similar manner to the electronic device 100 illustrated in FIG. 3, an operation feeling can be provided to the fingertip of the user through the tactile sensation according to the amount of movement of the operational input to the display panel 160B1. In that case, it is sufficient if the electronic device 100 illustrated in FIG. 3 is provided instead of the display panel 160B1.

Figure 20:
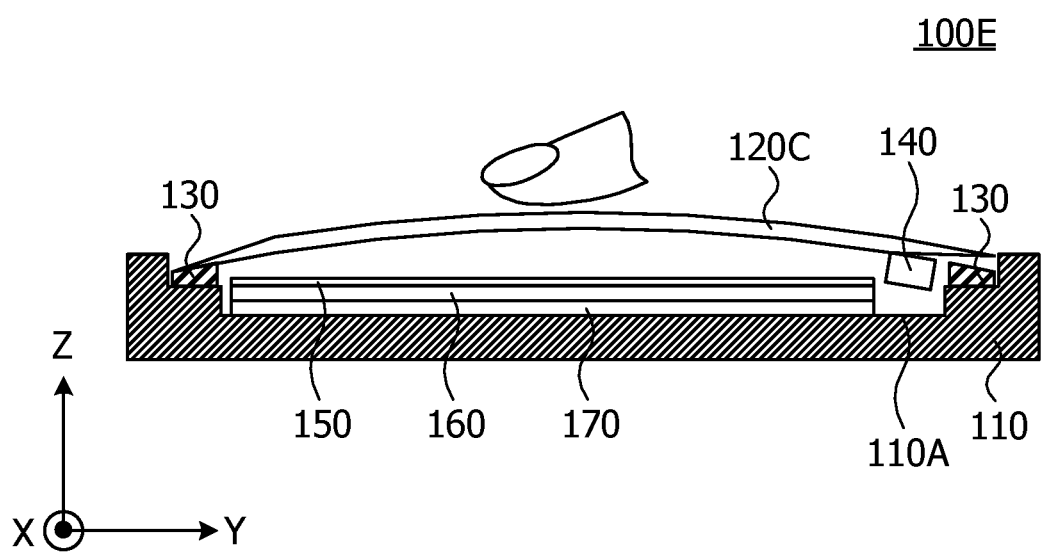
FIG. 20 is a plan view illustrating an operating state of an electronic device according to a fourth modification of the embodiment.

FIG. 20 is a plan view illustrating an operating state of an electronic device 100E according to a fourth modification of the embodiment.

The electronic device 100E includes the housing 110, a top panel 120C, the double-sided tape 130, the vibrating element 140, the touch panel 150, the display panel 160, and the substrate 170.

The electronic device 100E illustrated in FIG. 20 has a configuration similar to that of the electronic device 100 according to the embodiment illustrated in FIG. 3 except that the top panel 120C is curved glass.

The top panel 120C is curved such that the center portion in a plan view protrudes in the Z-axis positive direction side. Although FIG. 20 illustrates a cross-sectional shape of the top panel 120C in a YZ plane, a cross-sectional shape in an XZ plane is similar.

By using the top panel 120C made of curved glass in this manner, a favorable tactile sensation can be provided. This is particularly effective in the case where the actual shape of an object displayed as an image is curved.

Note that the embodiments in which the electronic device 100 includes the display panel 160 have been described. However, the electronic device 100 may drive the vibrating element 140 to generate the vibration in the surface 120A in the case where an operation is performed on the surface 120A of the top panel 120, without including the display panel 160. Such electronic devices 100F and 100G will be described with reference to FIGS. 21 and 22.

Figure 21:
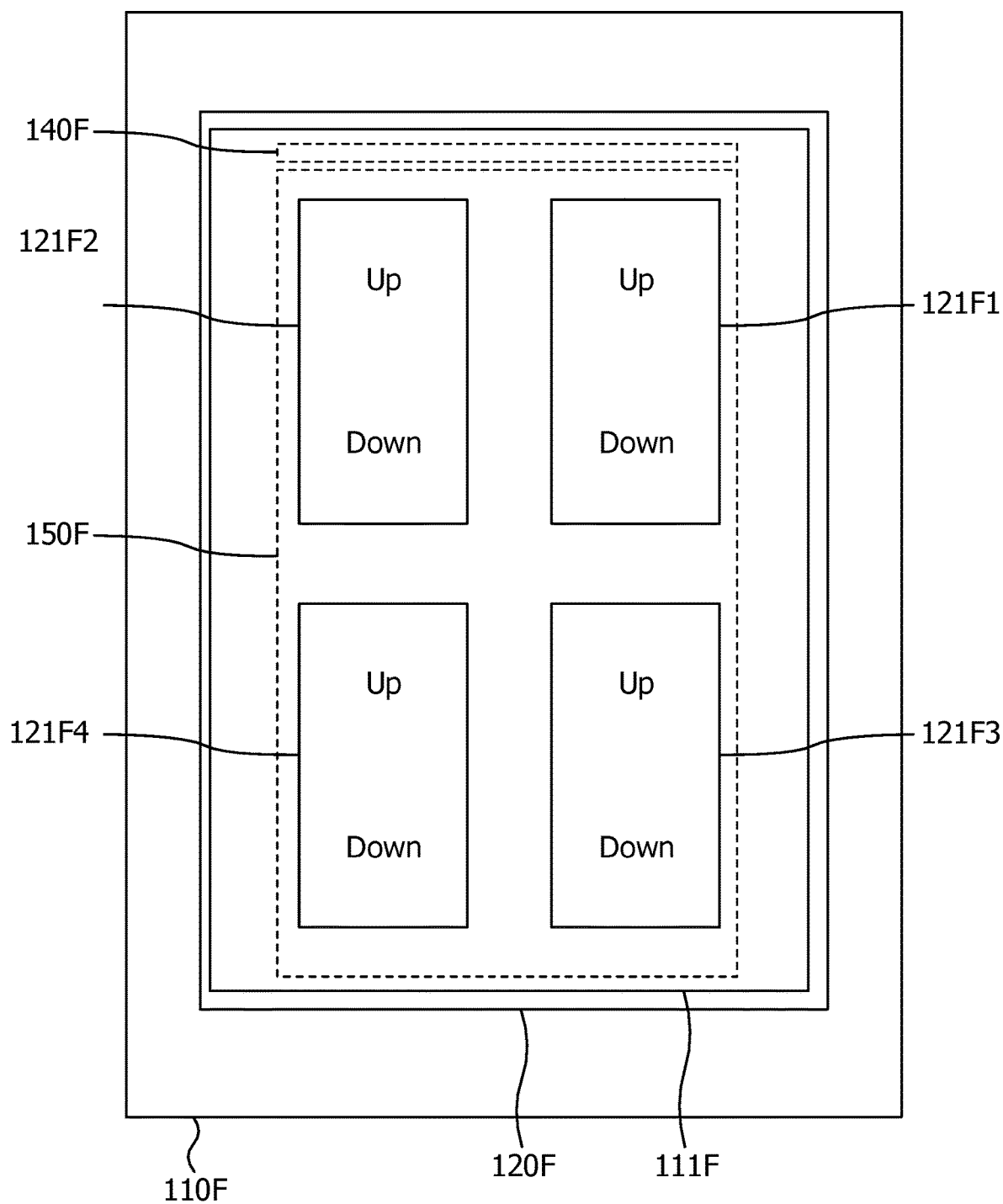
FIG. 21 is a view illustrating an electronic device according to a fifth modification of the embodiment.

FIG. 21 is a plan view illustrating an electronic device 100F according to a fifth modification of the embodiment. As illustrated in FIG. 21, operation portions 121F1, 121F2, 121F3, and 121F4 are disposed in an area where a touch panel 150F is disposed.

The operation portions 121F1, 121F2, 121F3, and 121F4 are printed on a back surface of a top panel 120F. For four areas on which the operation portions 121F1, 121F2, 121F3, and 121F4 are printed, each of positions in the XY coordinates is determined and converted into data, like the area data f1 to f4 illustrated in FIG. 7 and the area data f11 to f14 illustrated in FIG. 8. Furthermore, when the operational input is performed for the operation portions 121F1, 121F2, 121F3, and 121F4, a vibrating element 140F is driven by the drive control unit 240 in a predetermined vibration pattern.

Such a predetermined vibration pattern is only required to be stored in the memory 250 in association with the area data of the four areas where the operation portions 121F1, 121F2, 121F3, and 121F4 are printed, as in associating the vibration patterns P1 to P4 with the area data f1 to f4 illustrated in FIG. 7 and associating the vibration patterns P11 to P14 with the area data f11 to f14 illustrated in FIG. 8.

Note that in the electronic device 100F according to the fifth modification, the drive control unit 240 may drive the vibrating element 140F even in a case where the operational input is input to a portion other than the operation portions 121F1, 121F2, 121F3, and 121F4 within the area where the touch panel 150F is located in plan view.

In this case, as for area data indicating an area other than the operation portions 121F1, 121F2, 121F3, and 121F4, of the area where the touch panel 150F is located in plan view and data indicating the vibration pattern, data similar to the vibration patterns P1 to P4 and the area data f1 to f4 illustrated in FIG. 7 are only required to be associated with one another, and data similar to the vibration patterns P11 to P14 and the area data f11 to f14 illustrated in FIG. 8 are only required to be associated with one another.

The operation portions 121F1, 121F2, 121F3, and 121F4 are operation portions for performing opening and closing operations on a right front window, a left front window, a right rear window, and a left rear window, respectively.

Furthermore, when the user moves the fingertip in the four areas where the operation portions 121F1, 121F2, 121F3, and 121F4 are printed while touching the surface of the top panel 120F with the fingertip, the vibration for the squeeze effect is generated with the first drive signal. Thereby, the tactile sensation based on the change in the dynamic friction coefficient is provided to the fingertip of the user. Thereby, the user can discriminate the fingertip is located inside one of the operation portions 121F1, 121F2, 121F3, and 121F4 with the tactile sensation provided to the fingertip.

Then, in the electronic device 100F, when the fingertip of the user touches the top panel 120F inside one of the operation portions 121F1, 121F2, 121F3, and 121F4 and the top panel 120F is pressed from the state where the fingertip is detached from the top panel 120F, positional data input through the touch panel 150F is input to a control unit of a motor that drives each window. With the operation, the opening and closing operations on the right front window, the left front window, the right rear window, and the left rear window can be respectively performed.

Furthermore, by performing the pressing operation, the electronic device 100F generates the click feeling vibration with the second drive signal. With the vibration, the tactile sensation like the click feeling received by the fingertip when the user presses the metal dome-type button is provided to the fingertip of the user, and the user can discriminate which of the operation portions 121F1, 121F2, 121F3, and 121F4 has been operated with the tactile sensation. Note that, when the user stops the pressing operation, the operation of the window stops.

As described above, according to the electronic device 100F of the fifth modification, the natural vibration in the ultrasonic band of the top panel 120F is generated to change the dynamic friction force applied to the fingertip of the user. Therefore, a favorable tactile sensation can be provided to the user who operates the operation portions 121F1, 121F2, 121F3, and 121F4.

Furthermore, the electronic device 100F according to the fifth modification stops the vibration of the vibrating element 140 for a fixed period at a boundary of the operation portions 121F1, 121F2, 121F3, and 121F4, whereby the user can perceive the locations of the operation portions 121F1, 121F2, 121F3, and 121F4 with the tactile sensation of existence of a protrusion. Therefore, the electronic device 100F is very convenient.

Furthermore, the tactile sensation like the click feeling received by the fingertip when the user presses the metal dome-type button is provided to the fingertip of the user who has performed the pressing operation. The second drive signal is a drive signal for generating vibration of a frequency that can be sensed by the tactile receptor of a human in the top panel 120F, using the natural vibration in the ultrasonic band of the top panel 120F. As described above, since the vibration of the frequency that can be sensed by the tactile receptor of a human is generated by the natural vibration, a favorable tactile sensation with a large vibration amplitude and clearly sensed by the fingertip can be provided to the user. Note that the vibration patterns P1 to P4 may all be the same, and the vibration patterns P11 to P14 may all be the same.

Figure 22:
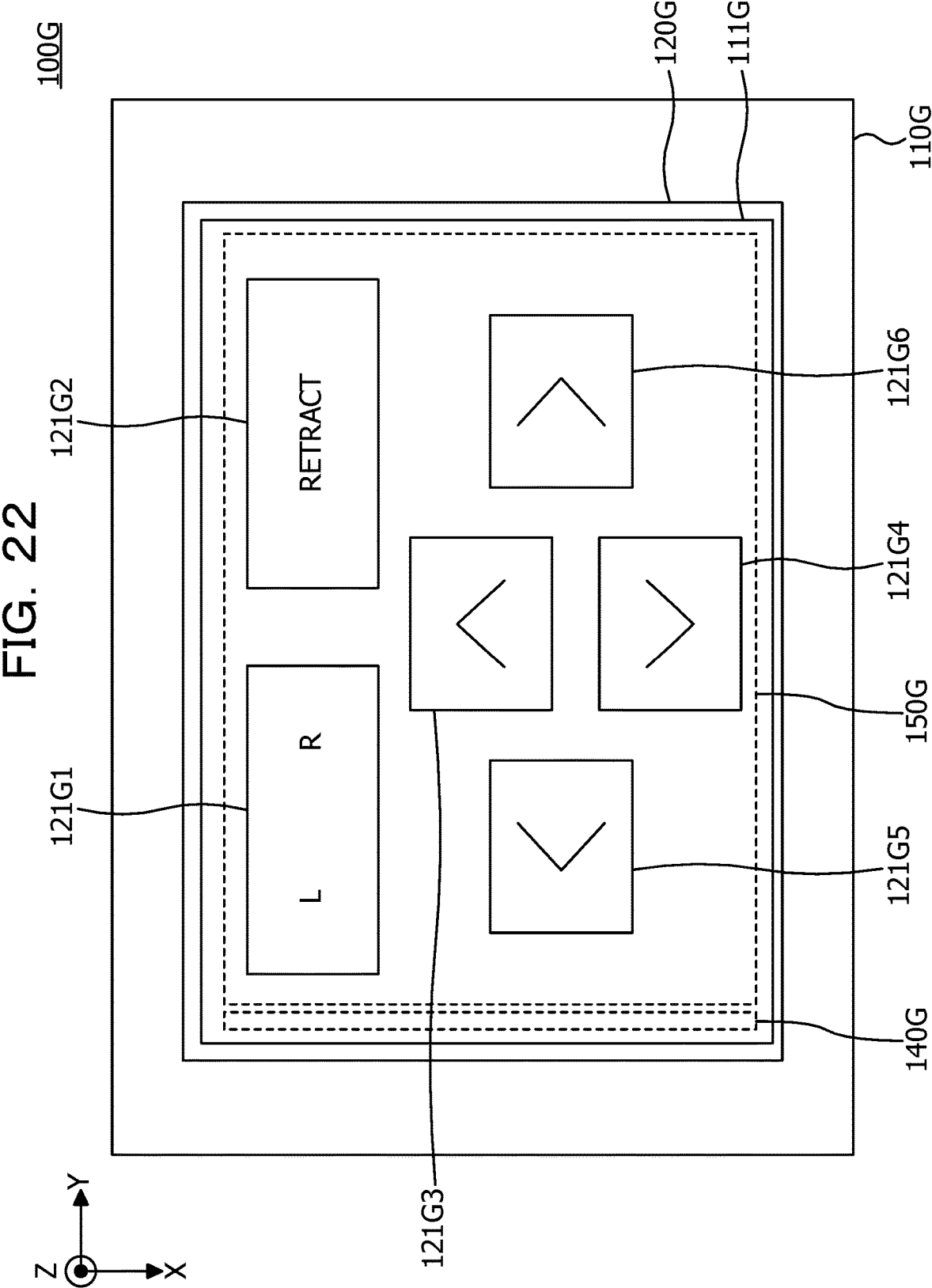
FIG. 22 is a view illustrating an electronic device according to a sixth modification of the embodiment.

FIG. 22 is a plan view illustrating an electronic device 100G according to a sixth modification of the embodiment. In the electronic device 100G, a vibrating element 140G and a touch panel 150G similar to the vibrating element 140F and the touch panel 150F of the electronic device 100F of the fifth modification are disposed inside a recess 111G of a housing 110G.

As illustrated in FIG. 22, operation portions 121G1, 121G2, 121G3, 121G4, 121G5, and 121G6 are disposed in an area where the touch panel 150G is disposed.

The operation portions 121G1, 121G2, 121G3, 121G4, 121G5, and 121G6 are printed on a back surface of a top panel 120G.

For six areas on which the operation portions 121G1, 121G2, 121G3, 121G4, 121G5, and 121G6 are printed, positions in the XY coordinates are determined and converted into data, like the area data f1 to f4 illustrated in FIG. 7 and the area data f11 to f14 illustrated in FIG. 8. Furthermore, when the operational input is performed for the operation portions 121G1, 121G2, 121G3, 121G4, 121G5, and 121G6, the vibrating element 140G is driven by the drive control unit 240 in a predetermined vibration pattern.

Such a predetermined vibration pattern is only required to be stored in the memory 250 in association with the area data of the six areas where the operation portions 121G1, 121G2, 121G3, 121G4, 121G5, and 121G6 are printed, as in associating the vibration patterns P1 to P4 with the area data f1 to f4 illustrated in FIG. 7 and associating the vibration patterns P11 to P14 with the area data f11 to f14 illustrated in FIG. 8.

The operation portions 121G1 and 121G2 are operation portions for selecting left and right outer mirrors and storing the outer mirrors, respectively. The operation portions 121G3, 121G4, 121G5, and 121G6 are operation portions for moving a mirror surface of the outer mirror up, down, left, and right, respectively.

When the user moves the fingertip in the six areas where the operation portions 121G1, 121G2, 121G3, 121G4, 121G5, and 121G6 are printed while touching the surface of the top panel 120G with the fingertip, the electronic device 100G generates vibration for the squeeze effect with the first drive signal. Thereby, the tactile sensation based on the change in the dynamic friction coefficient is provided to the fingertip of the user. Thereby, the user can discriminate the fingertip is located inside one of the operation portions 121G1, 121G2, 121G3, 121G4, 121G5, and 121G6 with the tactile sensation provided to the fingertip.

Furthermore, in the electronic device 100G, when the fingertip of the user touches the top panel 120G inside one of the operation portions 121G1, 121G2, 121G3, 121G4, 121G5, and 121G6 and the top panel 120G is pressed from the state where the fingertip is detached from the top panel 120G, positional data input through the touch panel 150G is input to a control unit of a motor that implements each operation of the outer mirror. Thereby, each operation of the outer mirror can be performed.

Furthermore, by performing the pressing operation, the electronic device 100G generates the click feeling vibration with the second drive signal. With the vibration, the tactile sensation like the click feeling received by the fingertip when the user presses the metal dome-type button is provided to the fingertip of the user, and the user can discriminate which of the operation portions 121G1, 121G2, 121G3, 121G4, 121G5, and 121G6 has been operated with the tactile sensation. Note that, when the user stops the pressing operation, the operation of the outer mirror stops. As described above, according to the electronic device 100G of the sixth modification, the natural vibration in the ultrasonic band of the top panel 120G is generated to change the dynamic friction force applied to the fingertip of the user, whereby a favorable tactile sensation can be provided to the user who operates the operation portions 121G1, 121G2, 121G3, 121G4, 121G5, and 121G6.

Furthermore, the electronic device 100G according to the sixth modification stops the vibration of the vibrating element 140 for a fixed period at a boundary of the operation portions 121G1, 121G2, 121G3, 121G4, 121G5, and 121G6, whereby the user can perceive the locations of the operation portions 121G1, 121G2, 121G3, 121G4, 121G5, and 121G6 with the tactile sensation of existence of a protrusion. Therefore, the electronic device 100G is very convenient.

Furthermore, the tactile sensation like the click feeling received by the fingertip when the user presses the metal dome-type button is provided to the fingertip of the user who has performed the pressing operation. The second drive signal is a drive signal for generating vibration of a frequency that can be sensed by the tactile receptor of a human in the top panel 120G, using the natural vibration in the ultrasonic band of the top panel 120G. As described above, since the vibration of the frequency that can be sensed by the tactile receptor of a human is generated by the natural vibration, a favorable tactile sensation with a large vibration amplitude and clearly sensed by the fingertip can be provided to the user. Note that the vibration patterns P1 to P4 may all be the same, and the vibration patterns P11 to P14 may all be the same.

Note that the electronic devices 100F and 100G can be handled as input devices.

Although the drive control device, the electronic device, and the drive control method according to the exemplary embodiments of the present invention have been described, it should be understood that the present invention is not limited to the embodiments disclosed in detail, and various changes and alterations could be made hereto without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A vibrating element of the electronic device with a drive signal, the drive signal being configured to cause the mechanical vibrating element to generate natural vibration in the operation surface causing bending in the top panel and being obtained by modulating a waveform signal of a first frequency in an ultrasonic band with a modulation signal of a second frequency that is a frequency having a difference from the first frequency, the difference being able to be sensed by a tactile receptor of a human, wherein the top panel has a rectangular shape, wherein the mechanical vibrating element is bonded to the top panel along a length direction of the top panel, the length direction being shorter than a width direction of the top panel, wherein the top panel is configured such that a resonant frequency of the top panel is expressed as following:

$$f = \frac{\pi k^2 t}{l^2} \sqrt{\frac{E}{3\rho(1-\delta^2)}}$$

here "E" represents Young's modulus of the too panel, "ρ" represents a density of the top panel, "δ" represents a Poisson's ratio of the top panel, "l" represents a long side dimension of the top panel, "t" represents a thickness of the top panel, and "k" represents a number of cycles of standing waves existing in a long side direction of the top panel.

2. The drive control device according to claim 1, further comprising:
a display provided on an opposite side of the operation surface of the top panel,
wherein the processor circuitry is further configured to execute a pressing operation determination processing that includes determining whether or not an operational input for pressing a GUI operation portion displayed on the display has been performed on the basis of the position of the operational input detected by the position detection circuit,
wherein the drive control processing is configured to drive the mechanical vibrating element with the drive signal when the operational input for pressing the GUI operation portion is determined by the pressing operation determination processing.

3. The drive control device according to claim 2,
wherein the pressing operation determination processing is configured to determine that the operational input for pressing the GUI operation portion has been performed when a state in which the position of the operational input is not detected by the position detection circuit is changed to a state in which the position of the operational input is detected in a display area of the GUI operation portion by the position detection circuit.

4. The drive control device according to claim 1,
wherein a length in an arrayed direction in which an antinode and a node of the natural vibration are arrayed on the top panel is a length of one or more wavelengths at the frequency sensed by the tactile receptor, and the mechanical vibrating element is arranged at an end of the top panel in the arrayed direction.

5. The drive control device according to claim 1,
wherein a frequency of the natural vibration is the difference between the first frequency and the second frequency.

6. An electronic device comprising:
a top panel having an operation surface;
a position detection circuit configured to detect a position of an operational input performed on the operation surface;
a mechanical vibrating element configured to generate vibration in the operation surface causing bending in the top panel; and
processor circuitry configured to execute a drive control processing that includes driving the mechanical vibrating element with a drive signal, the driving signal being configured to generate natural vibration in the operation surface causing bending in the top panel and being obtained by modulating a waveform signal of a first frequency in an ultrasonic band with a modulation signal of a second frequency that is a frequency having a difference from the first frequency, the difference being configured to be sensed by a tactile receptor of a human,
wherein the top panel has a rectangular shape,
wherein the mechanical vibrating element is bonded to the top panel along a length direction of the top panel, the length direction being shorter than a width direction of the top panel,
wherein the top panel is configured such that a resonant frequency of the top panel is expressed as following:

$$f = \frac{\pi k^2 t}{l^2} \sqrt{\frac{E}{3\rho(1-\delta^2)}}$$

where "E" represents Young's modulus of the top panel, "ρ" represents a density of the top panel, "δ" represents a Poisson's ratio of the top panel, "l" represents a long side dimension of the top panel, "t" represents a thickness of the top panel, and "k" represents a number of cycles of standing waves existing in a long side direction of the top panel.

7. A drive control method of driving a mechanical vibrating element of an electronic device including a top panel having an operation surface, a position detection circuit configured to detect a position of an operational input performed on the operation surface, and the mechanical vibrating element configured to generate vibration in the operation surface,
the drive control method implemented by a computer, the drive control method comprising:
obtaining a drive signal by modulating a waveform signal of a first frequency in an ultrasonic band with a modulation signal of a second frequency that is a frequency having a difference from the first frequency, the difference being configured to be sensed by a tactile receptor of a human;
driving the mechanical vibrating element with the drive signal, the drive signal being configured to generate natural vibration in the operation surface causing bending in the top panel,
wherein the top panel has a rectangular shape,
wherein the mechanical vibrating element is bonded to the top panel along a length direction of the top panel, the length direction being shorter than a width direction of the top panel,
wherein the top panel is configured such that a resonant frequency of the top panel is expressed as following:

$$f = \frac{\pi k^2 t}{l^2} \sqrt{\frac{E}{3\rho(1-\delta^2)}}$$

where "E" represents Young's modulus of the top panel, "ρ" represents a density of the top panel, "δ" represents a Poisson's ratio of the top panel, "l" represents a long side dimension of the top panel, "t" represents a thickness of the top panel, and "k" represents a number of cycles of standing waves existing in a long side direction of the top panel.

* * * * *